US012566316B2

(12) United States Patent
Dou

(10) Patent No.: US 12,566,316 B2
(45) Date of Patent: Mar. 3, 2026

(54) CAMERA OPTICAL LENS

(71) Applicant: Raytech Optical (Changzhou) Co., Ltd, Changzhou (CN)

(72) Inventor: Yimeng Dou, Shenzhen (CN)

(73) Assignee: Raytech Optical (Changzhou) Co., Ltd, Changzhou (CN)

( * ) Notice: Subject to any disclaimer, the term of this patent is extended or adjusted under 35 U.S.C. 154(b) by 786 days.

(21) Appl. No.: 17/136,013

(22) Filed: Dec. 29, 2020

(65) Prior Publication Data

US 2022/0091381 A1      Mar. 24, 2022

(30) Foreign Application Priority Data

Sep. 21, 2020    (CN) .......................... 202010991794.8

(51) Int. Cl.
*G02B 13/00*          (2006.01)
*G02B 9/62*           (2006.01)
(52) U.S. Cl.
CPC ........... *G02B 13/0045* (2013.01); *G02B 9/62* (2013.01)
(58) Field of Classification Search
CPC ... G02B 3/02; G02B 9/62; G02B 9/64; G02B 13/0045; G02B 15/146; G02B 27/0025; H04N 5/222; H04N 5/2254; H04N 23/55
USPC ......... 359/656–658, 708, 713, 749, 756–762
See application file for complete search history.

(56) References Cited

U.S. PATENT DOCUMENTS

| 8,687,292 | B2 * | 4/2014 | Tsai | .................... | G02B 13/0045 |
| | | | | | 359/713 |
| 9,557,534 | B1 * | 1/2017 | Liao | ........................ | G02B 13/06 |

| 10,203,477 | B2 * | 2/2019 | Dai | ........................... | G02B 9/62 |
| 2016/0103298 | A1 * | 4/2016 | Liao | ................... | G02B 13/0045 |
| | | | | | 359/764 |
| 2020/0363613 | A1 * | 11/2020 | Iwashita | ................ | G02B 13/04 |

FOREIGN PATENT DOCUMENTS

| CN | 111221096 | A | * | 6/2020 | ......... | G02B 13/0005 |
| CN | 111458838 | A | * | 7/2020 | ......... | G02B 13/0015 |
| CN | 111679409 | A | * | 9/2020 | ......... | G02B 13/0045 |
| CN | 111965786 | A | * | 11/2020 | ......... | G02B 13/0015 |

OTHER PUBLICATIONS

Google Patents translation of Zhang et al. (CN 111221096 A).*

* cited by examiner

*Primary Examiner* — Stephone B Allen
*Assistant Examiner* — Daniel J. Jordan
(74) *Attorney, Agent, or Firm* — Wiersch Law Group

(57) ABSTRACT

The present disclosure provides a camera optical lens with six lenses including from an object side to an image side: a first lens having a negative refractive power; a second lens having a positive refractive power; a third lens having a positive power; a fourth lens having a negative refractive power, a fifth lens having a positive power; and a sixth lens having a negative refractive power; wherein the camera optical lens satisfies following conditions: 3.00≤f2/f≤5.00; −10.00≤(R9+R10)/(R9−R10)≤−2.00; where f denotes a focal length of the camera optical lens, f2 denotes a focal length of the second lens, R9 denotes a central curvature radius of an object-side surface of the fifth lens, and R10 denotes a central curvature radius of an image-side surface of the fifth lens. The camera optical lens in the present disclosure satisfies a design requirement of wide angle and ultra-thinness while having good optical performance.

9 Claims, 12 Drawing Sheets

Longitudinal aberration

Lateral color

CAMERA OPTICAL LENS

TECHNICAL FIELD

The present disclosure relates to the field of optical lenses, in particular, to a camera optical lens suitable for handheld devices, such as smart phones and digital cameras, and imaging devices, such as monitors or PC lenses.

BACKGROUND

Recently, as smart phones spring up, a requirement of thinner and smaller camera lenses is rising day by day. A general camera lens usually employs a charge-coupled device (CCD) or complementary metal-oxide semiconductor sensor (CMOS sensor) as a photosensitive device thereof. Due to the improvement of semiconductor manufacturing technology, the pixel size of the photosensitive device is reduced. In addition to current development trends of electronic products going towards better functions and thinner and smaller dimensions, miniature camera lenses with good imaging quality are becoming a mainstream in the market.

In order to obtain better imaging quality, a lens that is traditionally equipped in a mobile phone camera adopts a three-piece or four-piece lens structure. However, with the development of technology and the diversification of user demand, the pixel area of the photosensitive device is decreasing and the imaging quality of the system is increasing. Accordingly, six-piece lens structure gradually appears in the lens design. Although a lens as such has good optical performance, the lens is fairly unreasonable in terms of setting of optical power, lens shape and distance between lenses, rendering that the lens structure with good optical performance cannot satisfy a design requirement of wide angle and ultra-thinness.

Accordingly, it is necessary to provide a camera optical lens satisfying a design requirement of wide angle and ultra-thinness while having good optical performance.

SUMMARY

To address the above issues, the present disclosure seeks to provide a camera optical lens that satisfies a design requirement of ultra-thinness and wide angle while having good optical performance.

The technical solutions of the present disclosure are as follows:

A camera optical lens with six lenses including, from an object side to an image side: a first lens having a negative refractive power; a second lens having a positive refractive power; a third lens having a positive power; a fourth lens having a negative refractive power, a fifth lens having a positive power; and a sixth lens having a negative refractive power; wherein the camera optical lens satisfies the following conditions:

$$3.00 \le f2/f \le 5.00; \text{ and}$$

$$-10.00 \le (R9+R10)/(R9-R10) \le -2.00;$$

where f denotes a focal length of the camera optical lens; f2 denotes a focal length of the second lens; R9 denotes a central curvature radius of an object-side surface of the fifth lens; and R10 denotes a central curvature radius of an image-side surface of the fifth lens.

As an improvement, the camera optical lens further satisfies the following condition:

$$-12.00 \le f6/f \le -3.00;$$

where f6 denotes a focal length of the sixth lens.

As an improvement, the camera optical lens further satisfies the following conditions:

$$-3.62 \le f1/f \le -1.01;$$

$$-0.75 \le (R1+R2)/(R1-R2) \le 0.11; \text{ and}$$

$$0.05 \le d1/TTL \le 0.21;$$

where f1 denotes a focal length of the first lens; R1 denotes a central curvature radius of an object-side surface of the first lens; R2 denotes a central curvature radius of an image-side surface of the first lens; d1 denotes an on-axis thickness of the first lens; and TTL denotes a total optical length of the camera optical lens.

As an improvement, the camera optical lens further satisfies the following conditions:

$$0.22 \le (R3+R4)/(R3-R4) \le 1.39; \text{ and}$$

$$0.06 \le d3/TTL \le 0.19;$$

where R3 denotes a central curvature radius of an object-side surface of the second lens; R4 denotes a central curvature radius of an image-side surface of the second lens; d3 denotes an on-axis thickness of the second lens; and TTL denotes a total optical length of the camera optical lens.

As an improvement, the camera optical lens further satisfies the following conditions:

$$0.53 \le f3/f \le 2.74;$$

$$-1.15 \le (R5+R6)/(R5-R6) \le -0.04; \text{ and}$$

$$0.06 \le d5/TTL \le 0.22;$$

where f3 denotes a focal length of the third lens; R5 denotes a central curvature radius of an object-side surface of the third lens; R6 denotes a central curvature radius of an image-side surface of the third lens; d5 denotes an on-axis thickness of the third lens; and TTL denotes a total optical length of the camera optical lens.

As an improvement, the camera optical lens further satisfies the following conditions:

$$-8.30 \le f4/f \le -1.45;$$

$$0.84 \le (R7+R8)/(R7-R8) \le 5.74; \text{ and}$$

$$0.02 \le d7/TTL \le 0.05;$$

where f4 denotes a focal length of the fourth lens; R7 denotes a central curvature radius of an object-side surface of the fourth lens; R8 denotes a central curvature radius of an image-side surface of the fourth lens; d7 denotes an on-axis thickness of the fourth lens; and TTL denotes a total optical length of the camera optical lens.

As an improvement, the camera optical lens further satisfies the following conditions:

$$0.72 \le f5/f \le 6.64; \text{ and}$$

$$0.03 \le d9/TTL \le 0.13;$$

where f5 denotes a focal length of the fifth lens; d9 denotes an on-axis thickness of the fifth lens; and TTL denotes a total optical length of the camera optical lens.

As an improvement, the camera optical lens further satisfies the following conditions:

$$1.95 \le (R11+R12)/(R11-R12) \le 16.88; \text{ and}$$

$$0.02 \le d11/TTL \le 0.10;$$

where R11 denotes a central curvature radius of an object-side surface of the sixth lens; R12 denotes a central curvature radius of an image-side surface of the sixth lens; d11 denotes an on-axis thickness of the sixth lens; and TTL denotes a total optical length of the camera optical lens.

As an improvement, the camera optical lens further satisfies the following condition:

$$TTL/IH \leq 2.10;$$

where TTL denotes a total optical length of the camera optical lens; and IH denotes an image height of the camera optical lens.

As an improvement, the camera optical lens further satisfies the following condition:

$$FOV \geq 160.00°;$$

where FOV denotes a field of view of the camera optical lens.

As an improvement, the first lens and the third lens are made of glass.

The present disclosure is advantageous in: the camera optical lens in the present disclosure has good optical performance and has characteristics of wide angle and ultra-thinness, and is especially fit for WEB camera lenses and mobile phone camera lens assemblies composed by such camera elements as CCD and CMOS for high pixels.

DETAILED DESCRIPTION OF EMBODIMENTS

The present disclosure is further described with reference to accompanying drawings and embodiments in the following.

To make the objects, technical solutions, and advantages of the present disclosure clearer, embodiments of the present disclosure are described in detail with reference to accompanying drawings in the following. A person of ordinary skill in the art can understand that, in the embodiments of the present disclosure, many technical details are provided to make readers better understand the present disclosure. However, even without these technical details and any changes and modifications based on the following embodiments, technical solutions required to be protected by the present disclosure can be implemented.

Embodiment 1

Figure 1:
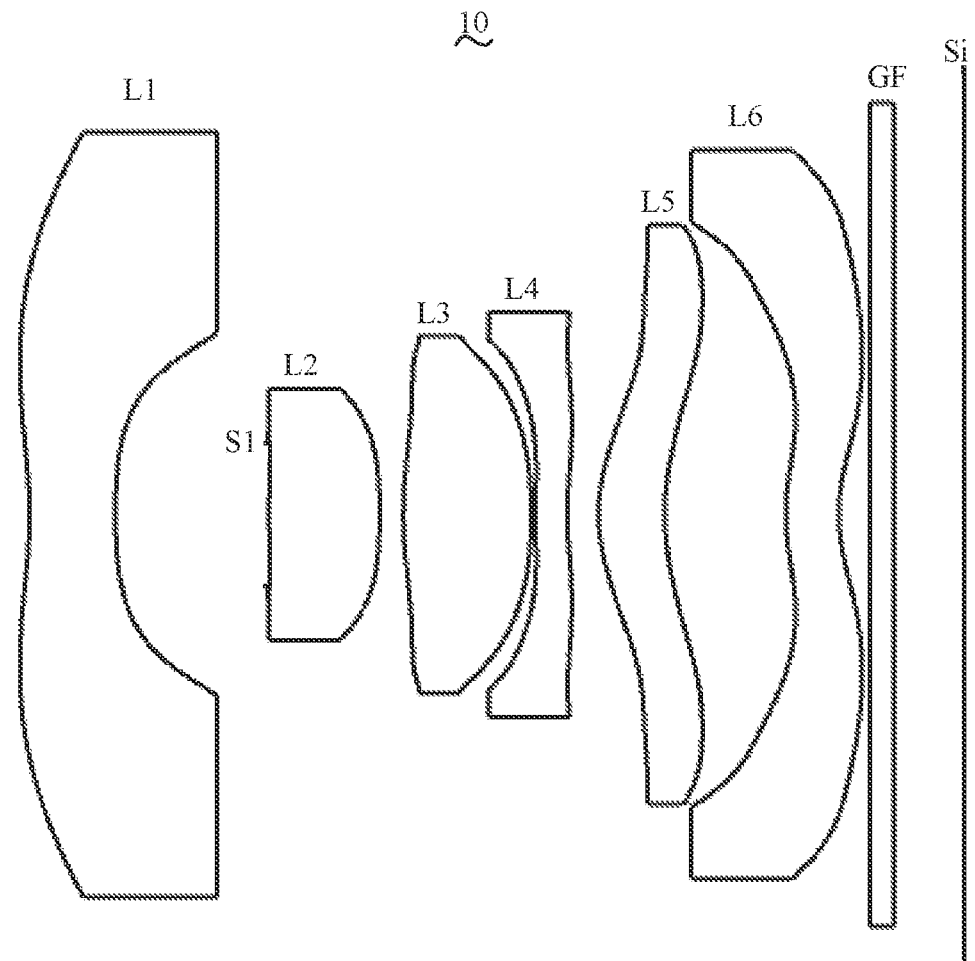
FIG. 1 is a schematic diagram of a structure of a camera optical lens according to Embodiment 1 of the present disclosure.

Referring to the drawings, the present disclosure provides a camera optical lens 10. FIG. 1 shows the camera optical lens 10 of Embodiment 1 of the present disclosure. In FIG. 1, the left side is an object side of the camera optical lens 10, and the right side is an image side of the camera optical lens 10. The camera optical lens 10 includes six lenses. The camera optical lens 10 includes, from an object side to an image side: an aperture S1, a first lens L1, a second lens L2, a third lens L3, a fourth lens L4, a fifth lens L5 and a sixth lens L6. An optical filter GF can be further included and arranged between the sixth lens L6 and the image surface Si.

In this embodiment, the first lens L1 is made of glass, the second lens L2 is made of plastic, the third lens L3 is made of glass, the fourth lens L4 is made of plastic, the fifth lens L5 is made of plastic and the sixth lens L6 is made of plastic. In other embodiments, each lens can be made of other materials.

In this embodiment, the first lens L1 has a negative refractive power, the second lens L2 has a positive refractive power, the third lens L3 has a positive refractive power, the fourth lens L4 has a negative refractive power, the fifth lens L5 has a positive refractive power, and the sixth lens L6 has a negative refractive power.

In this embodiment, a focal length of the camera optical lens 10 is defined as f, a focal length of the second lens L2 is defined as f2, a central curvature radius of an object-side surface of fifth lens L5 is defined as R9, a central curvature radius of an image-side surface of the fifth lens L5 is defined as R10, and the camera optical lens 10 further satisfies the following conditions:

$$3.00 \leq f2/f \leq 5.00; \quad (1)$$

$$-10.00 \leq (R9+R10)/(R9-R10) \leq -2.00; \quad (2)$$

wherein, condition (1) specifies a ratio between the focal length f2 of the second lens L2 and the focal length f of the camera optical lens 10, which effectively balances spherical aberration and field curvature of the system; and condition (2) specifies a shape of the fifth lens L5, within a range of which it helps to alleviate a deflection degree of the light passing through the lens, and effectively reduces an aberration.

A focal length of the camera optical lens 10 is defined as f, a focal length of the sixth lens L6 is defined as f6, and the camera optical lens 10 further satisfies the following condition: $-12.00 \leq f6/f \leq -3.00$. This condition specifies a ratio between the focal length f6 of the sixth lens L6 and the focal length f of the camera optical lens 10. With a reasonable distribution of focal length, the system has better imaging quality and lower sensitivity.

In this embodiment, the first lens L1 includes an object-side surface being concave in a paraxial region and an image-side surface being concave in the paraxial region.

A focal length of the camera optical lens 10 is defined as f, a focal length of the first lens L1 is defined as f1, and the camera optical lens 10 further satisfies the following condition: $-3.62 \leq f1/f \leq -1.01$. This condition specifies a ration between the focal length f1 of the first lens L1 and the focal length f of the camera optical lens 10. Within this specified range of ratio, the first lens L1 has a proper positive refractive power, which facilitates development of camera optical lens towards ultra-thinness and wide angle. Preferably, the camera optical lens 10 further satisfies the following condition: $-2.26 \leq f1/f \leq -1.26$.

A central curvature radius of an object-side surface of the first lens L1 is defined as R1, a central curvature radius of an image-side surface of the first lens L1 is defined as R2, and the camera optical lens 10 further satisfies the following condition: $-0.75 \leq (R1+R2)/(R1-R2) \leq -0.11$. This condition specifies a shape of the first lens L1 reasonably, thereby effectively correcting spherical aberration of the camera optical lens 10. Preferably, the camera optical lens 10 further satisfies the following condition: $-0.47 \leq (R1+R2)/(R1-R2) \leq 0.08$.

An on-axis thickness of the first lens L1 is defined as d1, a total optical length of the camera optical lens 10 is defined as TTL, and the camera optical lens 10 further satisfies the following condition: $0.05 \leq d1/TTL \leq 0.21$, within a range of which it facilitates realizing ultra-thinness. Preferably, the camera optical lens 10 further satisfies the following condition: $0.07 \leq d1/TTL \leq 0.17$.

In this embodiment, the second lens L2 includes an object-side surface being convex in a paraxial region and an image-side surface being convex in the paraxial region.

A central curvature radius of an object-side surface of the second lens L2 is defined as R3, a central curvature radius of an image-side surface of the second lens L2 is defined as R4, and the camera optical lens 10 further satisfies the following condition: $0.22 \leq (R3+R4)/(R3-R4) \leq 1.39$. Within this condition, which specifies a shape of the second lens L2, it facilitates correcting the on-axis aberration along with the development of the lenses towards ultra-thinness and wide angle. Preferably, the camera optical lens 10 satisfies the following condition: $0.35 \leq (R3+R4)/(R3-R4) \leq 1.11$.

An on-axis thickness of the second lens L2 is defined as d3, a total optical length of the camera optical lens 10 is defined as TTL, and the camera optical lens 10 further satisfies the following condition: $0.06 \leq d3/TTL \leq 0.19$. Within this condition, ultra-thinness can be realized. Preferably, the camera optical lens 10 satisfies the following condition: $0.09 \leq d3/TTL \leq 0.15$.

In this embodiment, the third lens L3 includes an object-side surface being convex in a paraxial region and an image-side surface being convex in the paraxial region.

A focal length of the third lens L3 is defined as f3, a focal length of the camera optical lens 10 is defined as f, and the camera optical lens 10 further satisfies the following condition: $0.53 \leq f3/f \leq 2.74$. With a reasonable distribution of the refractive power, the system has better imaging quality and lower sensitivity. Preferably, the camera optical lens 10 satisfies the following condition: $0.85 \leq f3/f \leq 2.19$.

A central curvature radius of an object-side surface of the third lens L3 is defined as R5, a central curvature radius of an image-side surface of the third lens L3 is defined as R6, and the camera optical lens 10 further satisfies the following condition: $-1.15 \leq (R5+R6)/(R5-R6) \leq -0.04$. This condition specifies a shape of the third lens L3, within a range of which it helps alleviate a deflection degree of the light passing through the lens, and effectively reduce an aberration. Preferably, the camera optical lens 10 satisfies the following condition: $-0.72 \leq (R5+R6)/(R5-R6) \leq -0.05$.

An on-axis thickness of the third lens L3 is defined as d5, a total optical length of the camera optical lens 10 is defined as TTL, and the camera optical lens 10 further satisfies the following condition: $0.06 \leq d5/TTL \leq 0.22$, within a range of which it facilitates realizing ultra-thinness. Preferably, the camera optical lens 10 satisfies the following condition: $0.10 \leq d5/TTL \leq 0.18$.

In this embodiment, the fourth lens L4 includes an object-side surface being convex in a paraxial region and an image-side surface being concave in the paraxial region.

A focal length of the fourth lens L4 is defined as f4, a focal length of the camera optical lens 10 is defined as f, and the camera optical lens 10 further satisfies the following condition: $-8.30 \leq f4/f \leq -1.45$. With a reasonable distribution of refractive power, the system has better imaging quality and lower sensitivity. Preferably, the camera optical lens 10 satisfies the following condition: $-5.19 \leq f4/f \leq -1.81$.

A central curvature radius of an object-side surface of the fourth lens L4 is defined as R7, a central curvature radius of an image-side surface of the fourth lens L4 is defined as R8, and the camera optical lens 10 further satisfies the following condition: $0.84 \leq (R7+R8)/(R7-R8) \leq 5.74$. Within this condition, which specifies a shape of the fourth lens L4, it facilitates correcting the off-axis aberration along with the development towards ultra-thinness and wide angle. Preferably, the camera optical lens 10 satisfies the following condition: $1.34 \leq (R7+R8)/(R7-R8) \leq 4.60$.

An on-axis thickness of the fourth lens L4 is defined as d7, a total optical length of the camera optical lens 10 is defined as TTL, and the camera optical lens 10 further satisfies the following condition: $0.02 \leq d7/TTL \leq 0.05$, within a range of which it facilitates realizing ultra-thinness. Preferably, the camera optical lens 10 satisfies the following condition: $0.03 \leq d7/TTL \leq 0.04$.

In this embodiment, the fifth lens L5 includes an object-side surface being convex in a paraxial region and an image-side surface being concave in the paraxial region.

A focal length of the fifth lens L5 is defined as f5, a focal length of the camera optical lens 10 is defined as f, and the camera optical lens 10 further satisfies the following condition: $0.72 \leq f5/f \leq 6.64$, which specifies the fifth lens L5 so as to make a light angle of the camera optical lens 10 to be gentle and reduce tolerance sensitivity. Preferably, the camera optical lens 10 satisfies the following condition: $1.16 \leq f5/f \leq 5.31$.

An on-axis thickness of the fifth lens L5 is defined as d9, a total optical length of the camera optical lens 10 is defined as TTL, and the camera optical lens 10 further satisfies the following condition: $0.03 \leq d9/TTL \leq 0.13$, within a range of which it facilitates realizing ultra-thinness. Preferably, the camera optical lens 10 satisfies the following condition: $0.05 \leq d9/TTL \leq 0.11$.

In this embodiment, the sixth lens L6 includes an object-side surface being convex in a paraxial region and an image-side surface being concave in the paraxial region.

A central curvature radius of an object-side surface of the sixth lens L6 is defined as R11, a central curvature radius of an image-side surface of the sixth lens L6 is defined as R12, and the camera optical lens 10 further satisfies the following condition: $1.95 \leq (R11+R12)/(R11-R12) \leq 16.88$. Within this condition, which specifies a shape of the sixth lens L6, it facilitates correcting the off-axis aberration along with the development towards ultra-thinness and wide angle. Preferably, the camera optical lens 10 satisfies the following condition: $3.12 \leq (R11+R12)/(R11-R12) \leq 13.50$.

An on-axis thickness of the sixth lens L6 is defined as d11, a total optical length of the camera optical lens 10 is defined as TTL, and the camera optical lens 10 further satisfies the following condition: 0.02≤d11/TTL≤0.10, within a range of which it facilitates realizing ultra-thinness. Preferably, the camera optical lens 10 satisfies the following condition: 0.04≤d11/TTL≤0.08.

It will be understood that, in other embodiments, the object surfaces and the image surfaces of the first lens L1, the second lens L2, the third lens L3, the fourth lens L4, the fifth lens L5 and the sixth lens L6 can also be configured with other concave and convex distribution.

In this embodiment, a field of view of the camera optical lens 10 is defined as FOV, and the camera optical lens 10 further satisfies the following condition: FOV≥160.00°, thereby realizing wide angle.

In this embodiment, a total optical length of the camera optical lens 10 is defined as TTL, an image height of the camera optical lens 10 is defined as IH, and the camera optical lens 10 further satisfies the following condition: TTL/IH≤2.10, thereby realizing ultra-thinness.

When the focal length of the camera optical lens 10, the focal length and the central curvature radius of each lens satisfy the above conditions, the camera optical lens 10 has good optical performance and satisfies the design requirement of wide angle and ultra-thinness. According to the characteristics of the camera optical lens 10, the camera optical lens 10 is especially fit for WEB camera lenses and mobile phone camera lens assemblies composed by such camera elements as CCD and CMOS for high pixels.

In the following, examples will be used to describe the camera optical lens 10 of the present disclosure. The symbols recorded in each example will be described as follows. The focal length, on-axis distance, central curvature radius, on-axis thickness, inflexion point position, and arrest point position are all in units of mm.

TTL: Total optical length (an on-axis distance from the object side surface of the first lens L1 to the image surface Si of the camera optical lens along the optical axis) in mm.

FNO: ratio of an effective focal length and an entrance pupil diameter of the camera optical lens.

In addition, inflexion points and/or arrest points can be arranged on the object-side surface and/or the image-side surface of each lens, so as to satisfy the demand for high quality imaging. The description below can be referred for specific implementations.

Design data of the camera optical lens 10 as shown in FIG. 1 are shown as below.

The design data of the camera optical lens 10 in Embodiment 1 of the present disclosure are shown in Table 1 and Table 2.

TABLE 1

| | R | D | | nd | | vd |
|---|---|---|---|---|---|---|
| S1 | ∞ | d0= | −2.104 | | | |
| R1 | −3.761 | d1= | 0.758 | nd1 | 1.5267 | v1 | 76.60 |
| R2 | 5.729 | d2= | 1.359 | | | |
| R3 | 14.783 | d3= | 0.976 | nd2 | 1.5444 | v2 | 55.82 |
| R4 | −5.603 | d4= | 0.208 | | | |
| R5 | 3.276 | d5= | 1.128 | nd3 | 1.5267 | v3 | 76.60 |
| R6 | −8.179 | d6= | 0.040 | | | |
| R7 | 4.673 | d7= | 0.281 | nd4 | 1.6700 | v4 | 19.39 |
| R8 | 2.738 | d8= | 0.276 | | | |
| R9 | 1.376 | d9= | 0.585 | nd5 | 1.5346 | v5 | 55.69 |
| R10 | 1.928 | d10= | 1.070 | | | |
| R11 | 1.894 | d11= | 0.467 | nd6 | 1.6400 | v6 | 23.54 |
| R12 | 1.480 | d12= | 0.280 | | | |

TABLE 1-continued

| | R | D | | nd | | vd |
|---|---|---|---|---|---|---|
| R13 | ∞ | d13= | 0.210 | ndg | 1.5170 | vg | 64.17 |
| R14 | ∞ | d14= | 0.620 | | | |

In the table, meanings of various symbols will be described as follows.

S1: aperture;

R: curvature radius of a center of an optical surface;

R1: central curvature radius of the object-side surface of the first lens L1;

R2: central curvature radius of the image-side surface of the first lens L1;

R3: central curvature radius of the object-side surface of the second lens L2;

R4: central curvature radius of the image-side surface of the second lens L2;

R5: central curvature radius of the object-side surface of the third lens L3;

R6: central curvature radius of the image-side surface of the third lens L3;

R7: central curvature radius of the object-side surface of the fourth lens L4;

R8: central curvature radius of the image-side surface of the fourth lens L4;

R9: central curvature radius of the object-side surface of the fifth lens L5;

R10: central curvature radius of the image-side surface of the fifth lens L5;

R11: central curvature radius of the object-side surface of the sixth lens L6;

R12: central curvature radius of the image-side surface of the sixth lens L6;

R13: central curvature radius of an object-side surface of the optical filter GF;

R14: central curvature radius of an image-side surface of the optical filter GF;

d: on-axis thickness of a lens or on-axis distance between neighboring lenses;

d0: on-axis distance from the aperture S1 to the object-side surface of the first lens L1;

d1: on-axis thickness of the first lens L1;

d2: on-axis distance from the image-side surface of the first lens L1 to the object-side surface of the second lens L2;

d3: on-axis thickness of the second lens L2;

d4: on-axis distance from the image-side surface of the second lens L2 to the object-side surface of the third lens L3;

d5: on-axis thickness of the third lens L3;

d6: on-axis distance from the image-side surface of the third lens L3 to the object-side surface of the fourth lens L4;

d7: on-axis thickness of the fourth lens L4;

d8: on-axis distance from the image-side surface of the fourth lens L4 to the object-side surface of the fifth lens L5;

d9: on-axis thickness of the fifth lens L5;

d10: on-axis distance from the image-side surface of the fifth lens L5 to the object-side surface of the sixth lens L6;

d11: on-axis thickness of the sixth lens L6;

d12: on-axis distance from the image-side surface of the sixth lens L6 to the object-side surface of the optical filter GF;

d13: on-axis thickness of the optical filter GF;

d14: on-axis distance from the image-side surface of the optical filter GF to the image surface Si;

nd: refractive index of the d line;

nd1: refractive index of the d line of the first lens L1;

nd2: refractive index of the d line of the second lens L2;

nd3: refractive index of the d line of the third lens L3;

nd4: refractive index of the d line of the fourth lens L4;

nd5: refractive index of the d line of the fifth lens L5;

nd6: refractive index of the d line of the sixth lens L6;

ndg: refractive index of the d line of the optical filter GF;

vd: abbe number;

v1: abbe number of the first lens L1;

v2: abbe number of the second lens L2;

v3: abbe number of the third lens L3;

v4: abbe number of the fourth lens L4;

v5: abbe number of the fifth lens L5;

v6 abbe number of the sixth lens L6;

vg: abbe number of the optical filter GF.

Table 2 shows aspheric surface coefficients of each lens of the camera optical lens 10 according to Embodiment 1 of the present disclosure.

For convenience, an aspheric surface of each lens surface uses the aspheric surfaces shown in the above formula (3). However, the present disclosure is not limited to the aspherical polynomials form shown in the formula (3).

Table 3 and Table 4 show design data of inflexion points and arrest points of each lens of the camera optical lens 10 according to Embodiment 1. P1R1 and P1R2 represent the object-side surface and the image-side surface of the first lens L1, P2R1 and P2R2 represent the object-side surface and the image-side surface of the second lens L2, P3R1 and P3R2 represent the object-side surface and the image-side surface of the third lens L3, P4R1 and P4R2 represent the object-side surface and the image-side surface of the fourth lens L4, P5R1 and P5R2 represent the object-side surface and the image-side surface of the fifth lens L5, P6R1 and P6R2 represent the object-side surface and the image-side surface of the sixth lens L6. The data in the column named "inflexion point position" refer to vertical distances from inflexion points arranged on each lens surface to the optic axis of the camera optical lens 10. The data in the column named "arrest point position" refer to vertical distances from

TABLE 2

| | Conic coefficient | Aspheric surface coefficients | | | | |
|---|---|---|---|---|---|---|
| | k | A4 | A6 | A8 | A10 | A12 |
| R1 | −3.4910E+01 | 2.4230E−02 | −4.2837E−03 | 5.4904E−04 | −4.4768E−05 | 2.0317E−06 |
| R2 | 1.0864E+01 | 1.1915E−01 | −6.0669E−02 | 1.0261E−02 | 9.2245E−02 | −1.3854E−01 |
| R3 | −3.9315E+00 | −7.5366E−02 | 1.2288E−01 | −1.9013E+00 | 1.2735E+01 | −5.2410E+01 |
| R4 | 2.0876E+01 | −1.5958E−01 | 1.7996E−02 | 1.9860E−01 | −7.6537E−01 | 1.4962E+00 |
| R5 | −7.6039E+00 | −7.7987E−02 | 4.5622E−02 | −6.5924E−02 | 7.2592E−02 | −5.4002E−02 |
| R6 | 2.2031E+01 | −4.0344E−01 | 8.7327E−01 | −1.1857E+00 | 9.7206E−01 | −4.9773E−01 |
| R7 | −6.3015E+01 | −4.0705E−01 | 6.0200E−01 | −5.2879E−01 | 1.3584E−01 | 1.7427E−01 |
| R8 | −2.4914E+01 | −1.9479E−01 | 2.2736E−01 | −2.0387E−01 | 1.2501E−01 | −4.7364E−02 |
| R9 | −8.7864E+00 | 1.4185E−02 | 2.6617E−02 | −4.3649E−02 | 2.1889E−02 | −5.7216E−03 |
| R10 | −1.6220E+01 | −2.2737E−02 | 8.9728E−02 | −8.6070E−02 | 3.9580E−02 | −1.0556E−02 |
| R11 | −4.0926E+00 | −1.8788E−01 | 3.2741E−02 | 3.4682E−02 | −2.7427E−02 | 9.2815E−03 |
| R12 | −1.0759E+00 | −2.3198E−01 | 9.9308E−02 | −2.8808E−02 | 5.5198E−03 | −6.8061E−04 |

| | Conic coefficient | Aspheric surface coefficients | | | |
|---|---|---|---|---|---|
| | k | A14 | A16 | A18 | A20 |
| R1 | −3.4910E+01 | −4.0649E−08 | 1.2027E−10 | 0.0000E+00 | 0.0000E+00 |
| R2 | 1.0864E+01 | 9.5244E−02 | −3.4346E−02 | 6.1707E−03 | −4.3425E−04 |
| R3 | −3.9315E+00 | 1.3304E+02 | −2.0199E+02 | 1.6699E+02 | −5.7656E+01 |
| R4 | 2.0876E+01 | −1.7025E+00 | 1.1335E+00 | −4.0364E−01 | 5.8749E−02 |
| R5 | −7.6039E+00 | 3.1480E−02 | −1.2458E−02 | 2.7604E−03 | −2.5487E−04 |
| R6 | 2.2031E+01 | 1.5919E−01 | −3.0810E−02 | 3.3499E−03 | −1.6233E−04 |
| R7 | −6.3015E+01 | −1.8990E−01 | 8.3408E−02 | −1.8259E−02 | 1.6456E−03 |
| R8 | −2.4914E+01 | 1.0775E−02 | −1.4206E−03 | 9.9586E−05 | −2.8695E−06 |
| R9 | −8.7864E+00 | 8.8120E−04 | −8.0942E−05 | 4.1059E−06 | −8.8380E−08 |
| R10 | −1.6220E+01 | 1.7200E−03 | −1.6894E−04 | 9.1728E−06 | −2.1092E−07 |
| R11 | −4.0926E+00 | −1.7338E−03 | 1.8302E−04 | −1.0174E−05 | 2.3067E−07 |
| R12 | −1.0759E+00 | 5.2576E−05 | −2.4370E−06 | 6.1598E−08 | −6.5044E−10 |

In Table 2, k is a conic coefficient, and A4, A6, A8, A10, A12, A14, A16, A18 and A20 are aspheric surface coefficients.

$$y=(x^2/R)/[1+\{1-(k+1)(x^2/R^2)\}^{1/2}]+A4^{x4}+A6^{x6}+A8^{x8}+10^{x10}+A12^{x12}+A14^{x14}+A16^{x16}+A18^{x18}+A20^{x20} \quad (3)$$

Herein, x donates a vertical distance between a point in the aspheric curve and the optical axis, and y donates an aspheric depth (i.e. a vertical distance between the point having a distance of x from the optical axis and a plane tangent to the vertex on the optical axis of the aspheric surface).

arrest points arranged on each lens surface to the optical axis of the camera optical lens 10.

TABLE 3

| | Number(s) of inflexion points | Inflexion point position 1 | Inflexion point position 2 | Inflexion point position 3 |
|---|---|---|---|---|
| P1R1 | 1 | 0.635 | / | / |
| P1R2 | 2 | 1.505 | 1.615 | / |
| P2R1 | 1 | 0.275 | / | / |
| P2R2 | 0 | / | / | / |

TABLE 3-continued

| | Number(s) of inflexion points | Inflexion point position 1 | Inflexion point position 2 | Inflexion point position 3 |
|---|---|---|---|---|
| P3R1 | 2 | 0.575 | 1.125 | / |
| P3R2 | 1 | 1.485 | / | / |
| P4R1 | 2 | 0.215 | 1.575 | / |
| P4R2 | 2 | 0.375 | 1.195 | / |
| P5R1 | 3 | 0.965 | 1.865 | 2.175 |
| P5R2 | 1 | 1.085 | / | / |
| P6R1 | 2 | 0.465 | 2.585 | / |
| P6R2 | 1 | 0.595 | / | / |

TABLE 4

| | Number(s) of arrest points | Arrest point position 1 | Arrest point position 2 |
|---|---|---|---|
| P1R1 | 1 | 1.355 | / |
| P1R2 | 0 | / | / |
| P2R1 | 1 | 0.455 | / |
| P2R2 | 0 | / | / |
| P3R1 | 0 | / | / |
| P3R2 | 0 | / | / |
| P4R1 | 1 | 0.395 | / |
| P4R2 | 2 | 0.805 | 1.515 |
| P5R1 | 1 | 2.375 | / |
| P5R2 | 1 | 1.925 | / |
| P6R1 | 1 | 0.885 | / |
| P6R2 | 1 | 1.425 | / |

In addition, in the subsequent Table 17, various parameters of Embodiments 1, 2, 3 and 4 and values corresponding to the parameters specified in the above conditions are shown.

As shown in Table 17, Embodiment 1 satisfies the various conditions.

Figure 2:
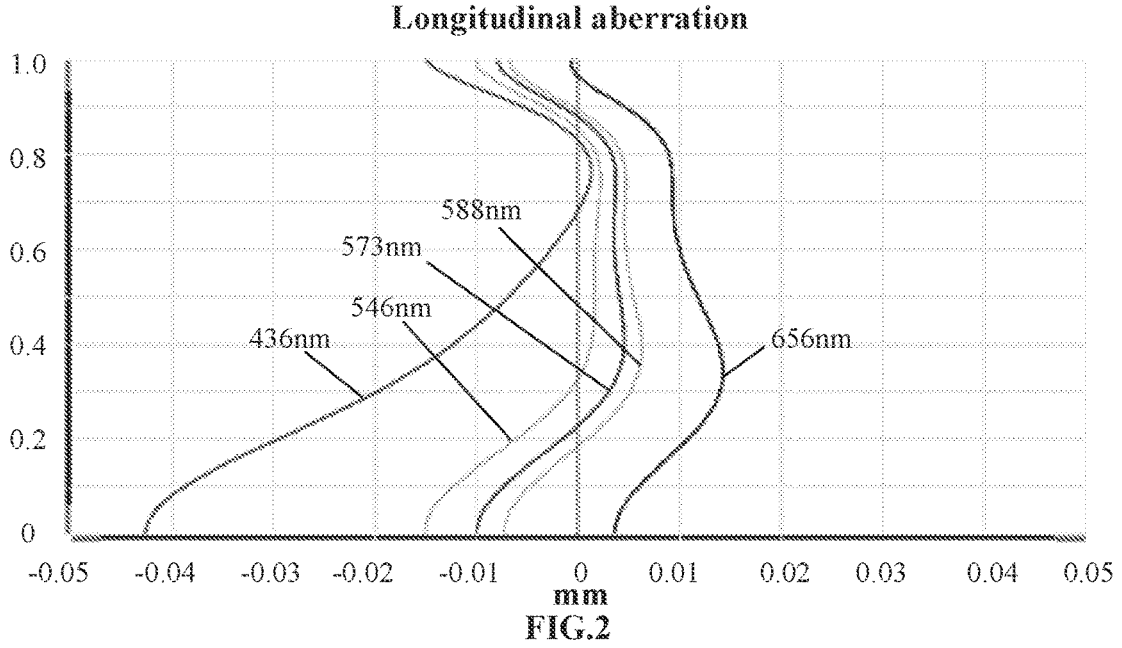
FIG. 2 is a schematic diagram of a longitudinal aberration of the camera optical lens shown in FIG. 1.
Figure 3:
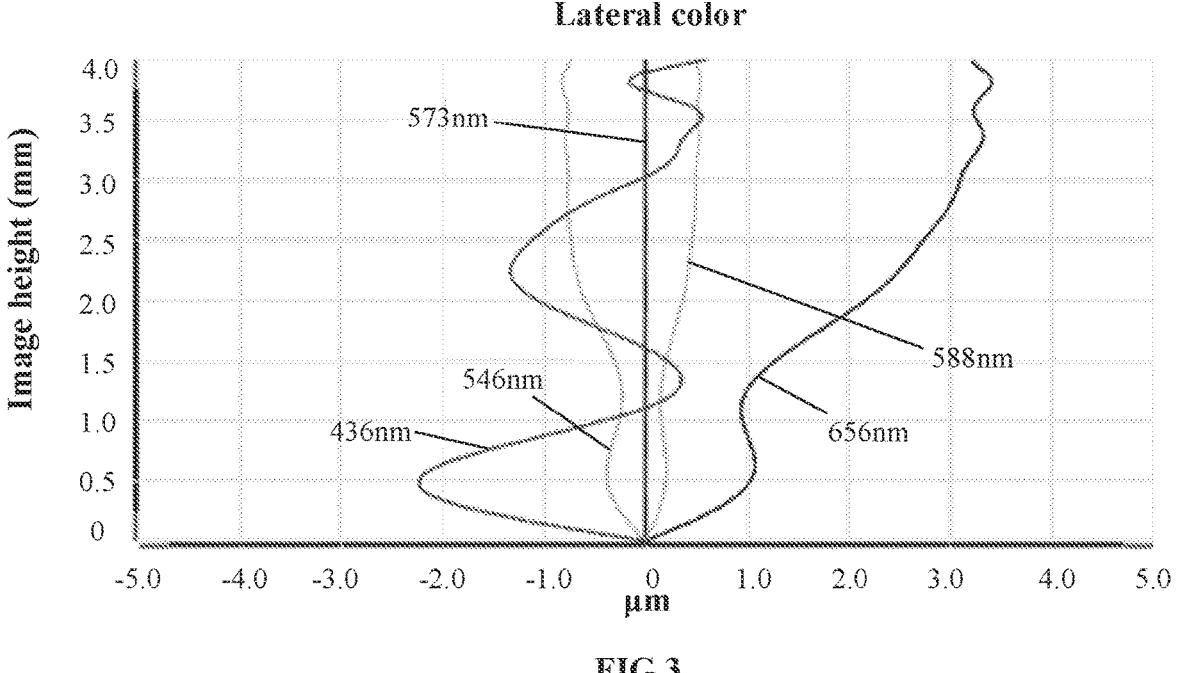
FIG. 3 is a schematic diagram of a lateral color of the camera optical lens shown in FIG. 1.
Figure 4:
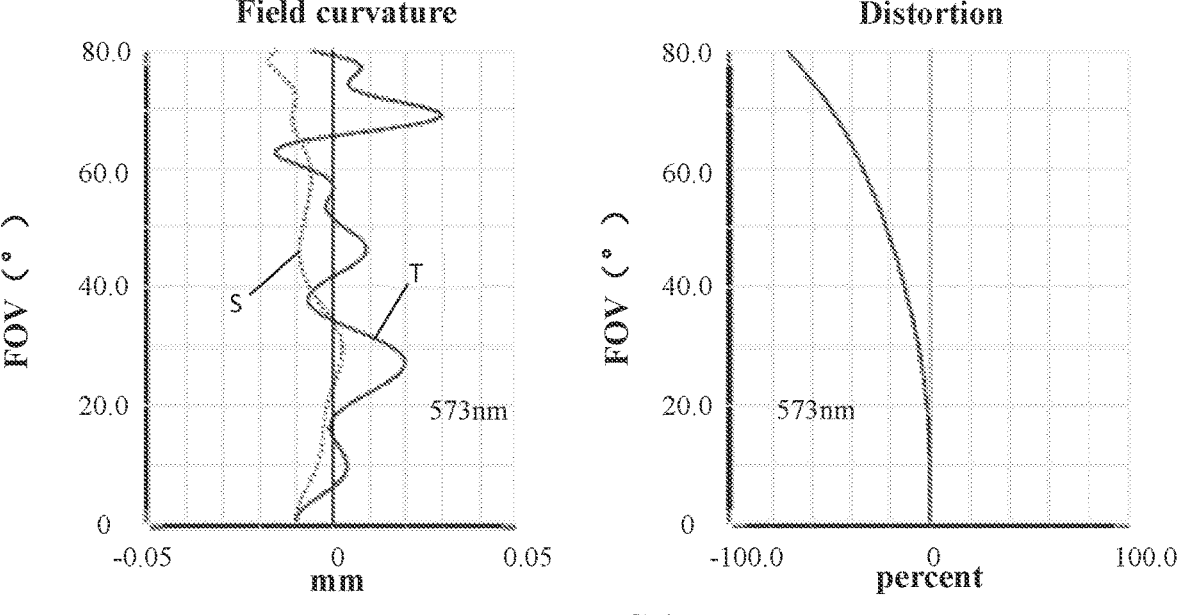
FIG. 4 is a schematic diagram of a field curvature and a distortion of the camera optical lens shown in FIG. 1.

FIG. 2 and FIG. 3 illustrate a longitudinal aberration and a lateral color of light with wavelengths of 656 nm, 588 nm, 573 nm, 546 nm and 436 nm after passing the camera optical lens 10, respectively. FIG. 4 illustrates a field curvature and a distortion with a wavelength of 573 nm after passing the camera optical lens 10. A field curvature S in FIG. 4 is a field curvature in a sagittal direction, and T is a field curvature in a tangential direction.

In this Embodiment, an entrance pupil diameter (ENPD) of the camera optical lens 10 is 0.915 mm, an image height of (IH) is 4.000 mm, and a field of view (FOV) in a diagonal direction is 160.00°. Thus, the camera optical lens 10 satisfy a design requirement of wide angle and ultra-thinness, the on-axis and off-axis aberration is sufficiently corrected, thereby achieving excellent optical performance.

Embodiment 2

Figure 5:
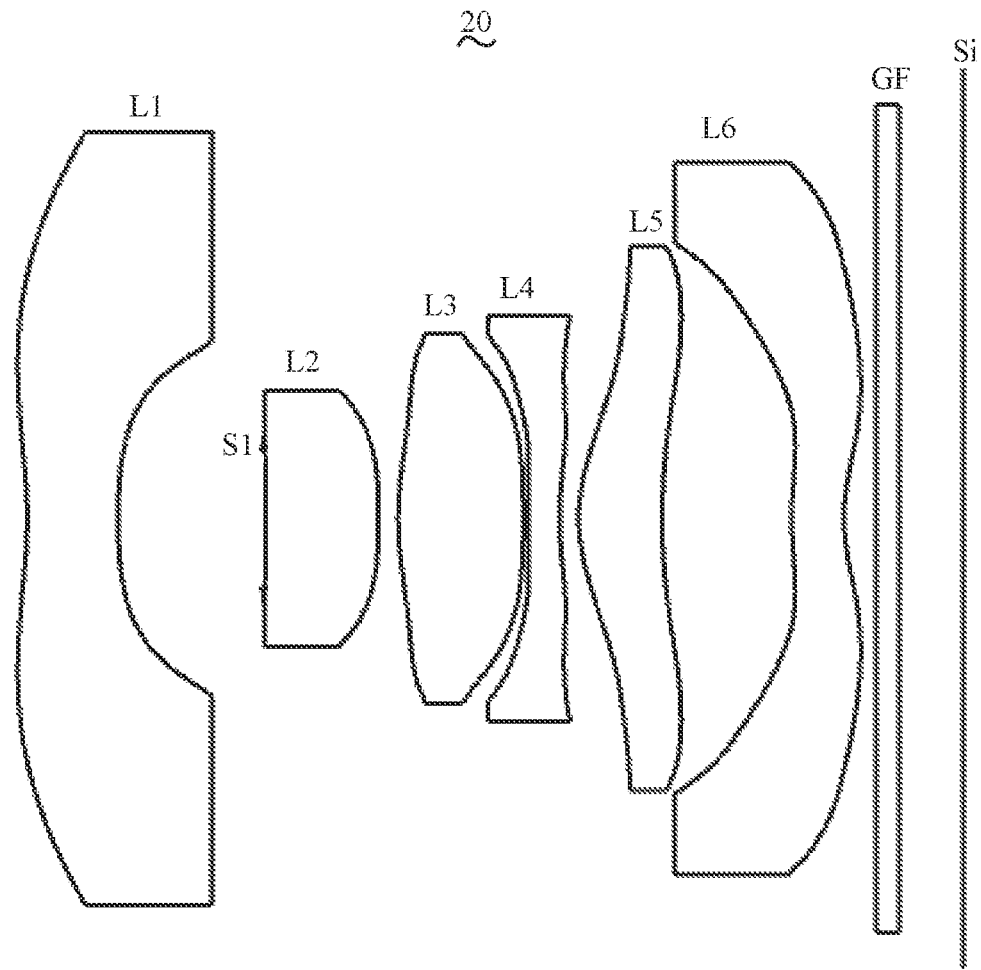
FIG. 5 is a schematic diagram of a structure of a camera optical lens according to Embodiment 2 of the present disclosure.

FIG. 5 is a schematic diagram of a structure of a camera optical lens 20 according to Embodiment 2. Embodiment 2 is basically the same as Embodiment 1 and involves symbols having the same meanings as Embodiment 1, the same part will not be described anymore and only differences therebetween will be described in the following.

Table 5 and Table 6 show design data of the camera optical lens 20 in Embodiment 2 of the present disclosure.

TABLE 5

| | R | | D | | nd | | vd |
|---|---|---|---|---|---|---|---|
| S1 | ∞ | d0= | −2.088 | | | | |
| R1 | −3.953 | d1= | 0.802 | nd1 | 1.5267 | v1 | 76.60 |
| R2 | 5.673 | d2= | 1.302 | | | | |
| R3 | 25.778 | d3= | 1.000 | nd2 | 1.5444 | v2 | 55.82 |
| R4 | −6.943 | d4= | 0.172 | | | | |
| R5 | 2.659 | d5= | 1.105 | nd3 | 1.5267 | v3 | 76.60 |
| R6 | −9.791 | d6= | 0.040 | | | | |
| R7 | 9.629 | d7= | 0.283 | nd4 | 1.6700 | v4 | 19.39 |
| R8 | 2.738 | d8= | 0.168 | | | | |
| R9 | 1.428 | d9= | 0.735 | nd5 | 1.5346 | v5 | 55.69 |
| R10 | 4.283 | d10= | 1.146 | | | | |
| R11 | 2.837 | d11= | 0.464 | nd6 | 1.6400 | v6 | 23.54 |
| R12 | 1.680 | d12= | 0.280 | | | | |
| R13 | ∞ | d13= | 0.210 | ndg | 1.5170 | vg | 64.17 |
| R14 | ∞ | d14= | 0.559 | | | | |

Table 6 shows aspheric surface coefficients of each lens of the camera optical lens 20 according to Embodiment 2 of the present disclosure.

TABLE 6

| | Conic coefficient | Aspheric surface coefficients | | | | |
|---|---|---|---|---|---|---|
| | k | A4 | A6 | A8 | A10 | A12 |
| R1 | −3.7976E+01 | 2.2147E−02 | −3.6269E−03 | 4.5276E−04 | −3.8038E−05 | 1.9681E−06 |
| R2 | 1.1100E+01 | 1.2575E−01 | −1.3147E−01 | 2.2529E−01 | −2.7239E−01 | 2.3510E−01 |
| R3 | 7.8343E+01 | −8.4587E−02 | 3.6120E−01 | −4.6832E+00 | 3.2517E+01 | −1.3905E+02 |
| R4 | 3.1411E+01 | −2.0733E−01 | 1.4941E−01 | −1.7220E−01 | 6.3148E−02 | 2.6712E−01 |
| R5 | −6.0293E+00 | −1.0643E−01 | 1.1629E−01 | −1.7459E−01 | 1.9262E−01 | −1.3521E−01 |
| R6 | 3.0636E+01 | 8.5476E−02 | −6.7517E−01 | 1.2774E+00 | −1.3875E+00 | 9.5517E−01 |
| R7 | −9.0000E+01 | 6.3986E−02 | −7.6728E−01 | 1.3226E+00 | −1.1920E+00 | 6.5234E−01 |
| R8 | −2.4914E+01 | −3.5656E−02 | −2.0476E−01 | 3.1740E−01 | −2.2030E−01 | 9.0928E−02 |
| R9 | −7.7201E+00 | 1.7973E−02 | −1.3079E−02 | −6.9780E−03 | 6.4655E−03 | −1.9881E−03 |
| R10 | −4.4956E+01 | −3.8755E−02 | 1.0467E−01 | −9.7352E−02 | 4.6740E−02 | −1.3380E−02 |
| R11 | −3.0692E+00 | −2.2950E−01 | 2.4054E−02 | 6.2008E−02 | −4.4129E−02 | 1.4791E−02 |
| R12 | −1.2280E+00 | −2.2015E−01 | 8.9743E−02 | −2.3615E−02 | 4.1597E−03 | −4.8440E−04 |

| | Conic coefficient | Aspheric surface coefficients | | | |
|---|---|---|---|---|---|
| | k | A14 | A16 | A18 | A20 |
| R1 | −3.7976E+01 | −5.6173E−08 | 6.7052E−10 | 0.0000E+00 | 0.0000E+00 |
| R2 | 1.1100E+01 | −1.3935E−01 | 5.3565E−02 | −1.1805E−02 | 1.1017E−03 |

TABLE 6-continued

| | | | | |
|---|---|---|---|---|
| R3 | 7.8343E+01 | 3.6848E+02 | −5.8715E+02 | 5.1293E+02 | −1.8816E+02 |
| R4 | 3.1411E+01 | −5.4779E−01 | 4.8097E−01 | −2.0651E−01 | 3.4919E−02 |
| R5 | −6.0293E+00 | 6.2148E−02 | −1.8098E−02 | 3.0118E−03 | −2.1762E−04 |
| R6 | 3.0636E+01 | −4.2294E−01 | 1.1624E−01 | −1.7912E−02 | 1.1754E−03 |
| R7 | −9.0000E+01 | −2.2019E−01 | 4.2711E−02 | −3.8797E−03 | 7.2347E−05 |
| R8 | −2.4914E+01 | −2.3817E−02 | 3.8923E−03 | −3.6006E−04 | 1.4292E−05 |
| R9 | −7.7201E+00 | 3.2555E−04 | −3.0813E−05 | 1.6003E−06 | −3.5331E−08 |
| R10 | −4.4956E+01 | 2.3749E−03 | −2.5651E−04 | 1.5407E−05 | −3.9310E−07 |
| R11 | −3.0692E+00 | −2.8261E−03 | 3.1059E−04 | −1.8144E−05 | 4.3421E−07 |
| R12 | −1.2280E+00 | 3.6038E−05 | −1.6257E−06 | 4.0169E−08 | −4.1521E−10 |

Table 7 and table 8 show design data of inflexion points and arrest points of each lens of the camera optical lens 20.

TABLE 7

| | Number(s) of inflexion points | Inflexion point position 1 | Inflexion point position 2 | Inflexion point position 3 |
|---|---|---|---|---|
| P1R1 | 1 | 0.645 | / | / |
| P1R2 | 1 | 1.495 | / | / |
| P2R1 | 1 | 0.215 | / | / |
| P2R2 | 0 | / | / | / |
| P3R1 | 2 | 0.615 | 1.085 | / |
| P3R2 | 1 | 1.465 | / | / |
| P4R1 | 1 | 0.325 | / | / |
| P4R2 | 2 | 0.425 | 1.045 | / |
| P5R1 | 3 | 0.885 | 1.845 | 1.925 |
| P5R2 | 1 | 1.095 | / | / |
| P6R1 | 2 | 0.365 | 2.445 | / |
| P6R2 | 1 | 0.545 | / | / |

TABLE 8

| | Number(s) of arrest points | Arrest point position 1 | Arrest point position 2 |
|---|---|---|---|
| P1R1 | 1 | 1.365 | / |
| P1R2 | 0 | / | / |
| P2R1 | 1 | 0.365 | / |
| P2R2 | 0 | / | / |
| P3R1 | 0 | / | / |
| P3R2 | 0 | / | / |
| P4R1 | 1 | 0.495 | / |
| P4R2 | 2 | 0.815 | 1.275 |
| P5R1 | 1 | 2.265 | / |
| P5R2 | 1 | 1.795 | / |
| P6R1 | 1 | 0.645 | / |
| P6R2 | 1 | 1.185 | / |

Figure 6:
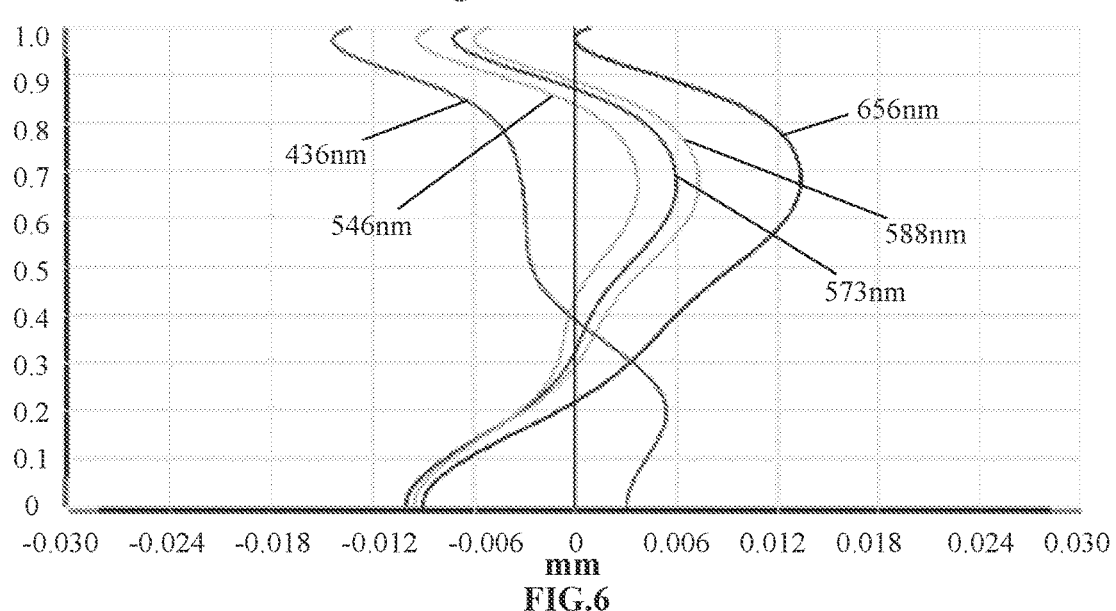
FIG. 6 is a schematic diagram of a longitudinal aberration of the camera optical lens shown in FIG. 5.
Figure 7:
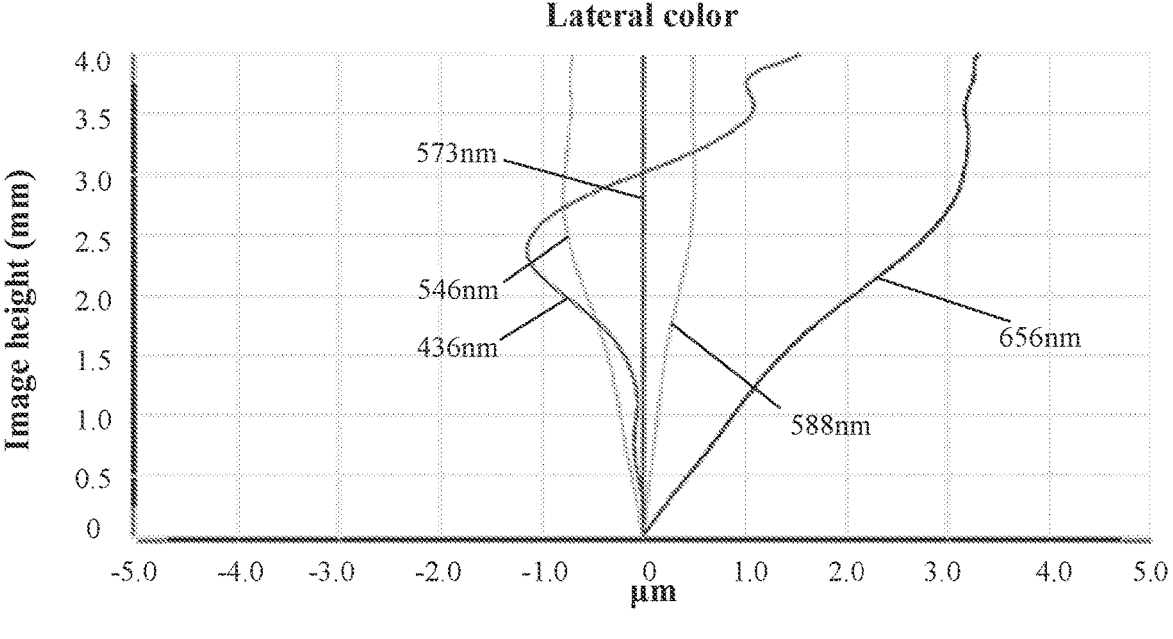
FIG. 7 is a schematic diagram of a lateral color of the camera optical lens shown in FIG. 5.
Figure 8:
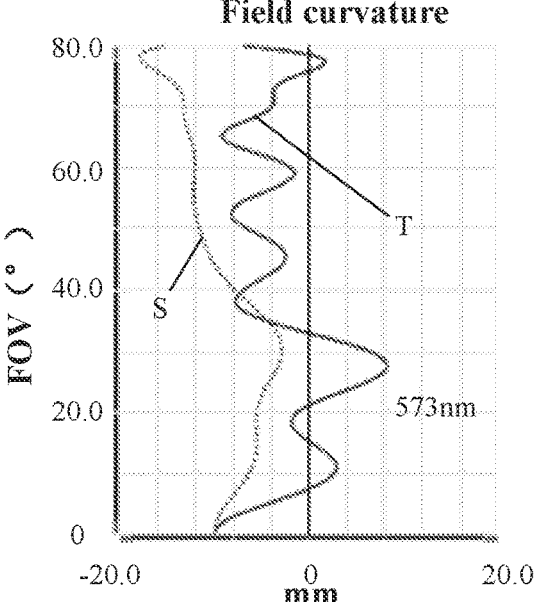
FIG. 8 is a schematic diagram of a field curvature and a distortion of the camera optical lens shown in FIG. 5.
Figure 8:
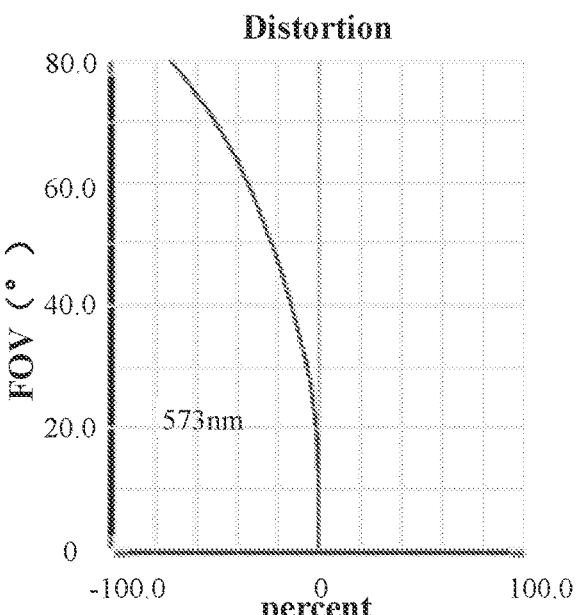

FIG. 6 and FIG. 7 illustrate a longitudinal aberration and a lateral color of light with wavelengths of 656 nm, 588 nm, 573 nm, 546 nm and 436 nm after passing the camera optical lens 20, respectively. FIG. 8 illustrates a field curvature and a distortion of light with a wavelength of 573 nm after passing the camera optical lens 20. A field curvature S in FIG. 8 is a field curvature in a sagittal direction, and T is a field curvature in a tangential direction.

As shown in following table 17, the camera optical lens 20 in the present embodiment satisfies each condition.

In this embodiment, an entrance pupil diameter (ENPD) of the camera optical lens 20 is 0.922 mm, an image height of (IH) is 4.000 mm, and a field of view (FOV) in the diagonal direction is 160.00°. Thus, the camera optical lens 20 satisfy a design requirement of wide angle and ultra-thinness, the on-axis and off-axis aberration is sufficiently corrected, thereby achieving excellent optical performance.

Embodiment 3

Figure 9:
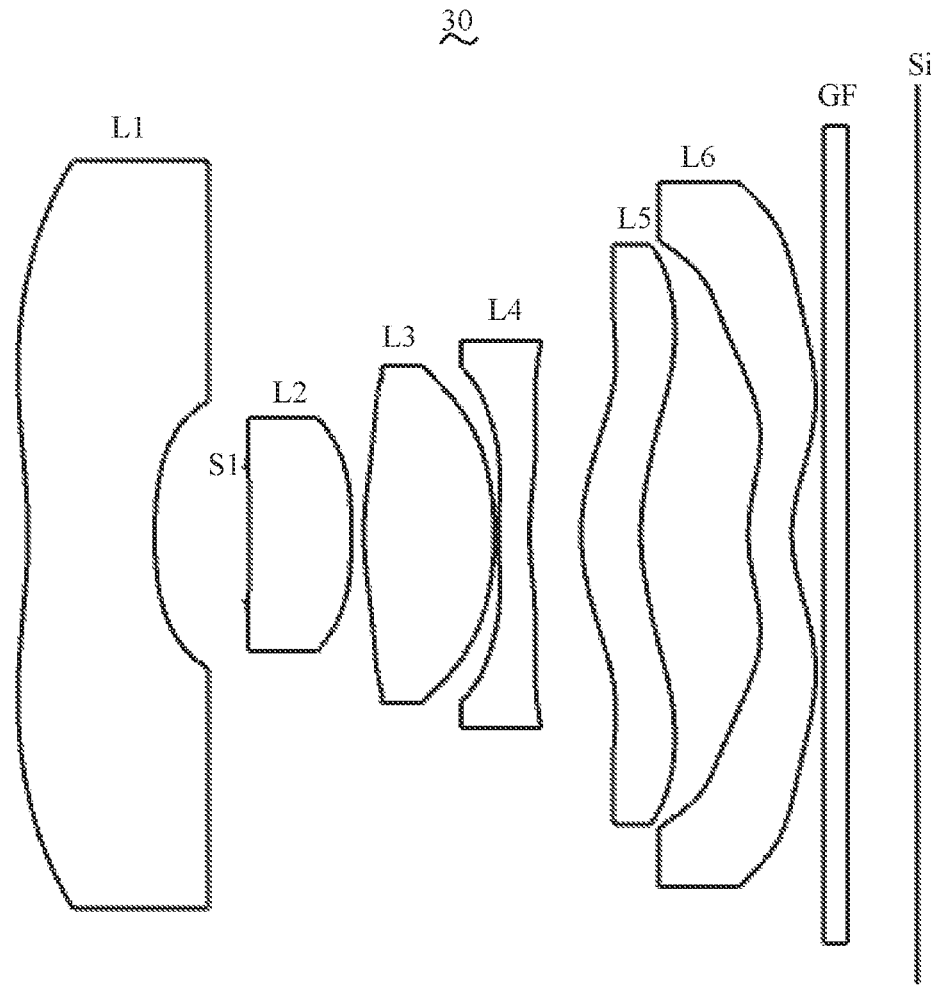
FIG. 9 is a schematic diagram of a structure of a camera optical lens according to Embodiment 3 of the present disclosure.

FIG. 9 is a schematic diagram of a structure of a camera optical lens 30 according to Embodiment 3. Embodiment 3 is basically the same as Embodiment 1 and involves symbols having the same meanings as Embodiment 1, the same part will not be described anymore and only differences therebetween will be described in the following.

In this embodiment, the first lens L1 and the third lens L3 are made of plastic.

Table 9 and Table 10 show design data of a camera optical lens 30 in Embodiment 3 of the present disclosure.

TABLE 9

| | R | D | | nd | | vd | |
|---|---|---|---|---|---|---|---|
| S1 | ∞ | d0= | −1.933 | | | | |
| R1 | −4.499 | d1= | 1.118 | nd1 | 1.5267 | v1 | 76.60 |
| R2 | 3.907 | d2= | 0.837 | | | | |
| R3 | 191.308 | d3= | 0.899 | nd2 | 1.5444 | v2 | 55.82 |
| R4 | −7.028 | d4= | 0.111 | | | | |
| R5 | 2.439 | d5= | 1.151 | nd3 | 1.5267 | v3 | 76.60 |
| R6 | −2.763 | d6= | 0.040 | | | | |
| R7 | 7.032 | d7= | 0.274 | nd4 | 1.6700 | v4 | 19.39 |
| R8 | 2.738 | d8= | 0.451 | | | | |
| R9 | 1.628 | d9= | 0.529 | nd5 | 1.5346 | v5 | 55.69 |
| R10 | 1.990 | d10= | 0.950 | | | | |
| R11 | 1.617 | d11= | 0.384 | nd6 | 1.6400 | v6 | 23.54 |
| R12 | 1.353 | d12= | 0.280 | | | | |
| R13 | ∞ | d13= | 0.210 | ndg | 1.5170 | vg | 64.17 |
| R14 | ∞ | d14= | 0.619 | | | | |

Table 10 shows aspheric surface coefficients of each lens of the camera optical lens 30 according to Embodiment 3 of the present disclosure.

TABLE 10

| | Conic coefficient k | Aspheric surface coefficients | | | | |
|---|---|---|---|---|---|---|
| | | A4 | A6 | A8 | A10 | A12 |
| R1 | −3.7642E+01 | 1.8245E−02 | −2.7376E−03 | 3.1005E−04 | −2.2043E−05 | 8.7511E−07 |
| R2 | 1.8197E+00 | 1.2056E−01 | −6.5763E−02 | 1.0264E−01 | 1.7799E−02 | −2.5213E−01 |
| R3 | −9.0000E+01 | −9.1729E−02 | 3.5870E−01 | −5.2139E+00 | 3.9774E+01 | −1.8688E+02 |

TABLE 10-continued

| R4 | 3.5315E+01 | -3.3458E-01 | 4.3405E-01 | -7.0736E-01 | 7.1082E-01 | 1.0725E-01 |
| R5 | -6.3080E+00 | -2.0306E-01 | 3.3405E-01 | -5.3821E-01 | 6.6466E-01 | -5.5220E-01 |
| R6 | -5.1907E+00 | 3.7376E-02 | -4.2165E-01 | 8.6219E-01 | -1.0881E+00 | 8.8085E-01 |
| R7 | -8.4851E+01 | -9.5704E-02 | -2.6167E-01 | 5.5993E-01 | -5.4710E-01 | 3.1488E-01 |
| R8 | -2.4914E+01 | -1.0539E-01 | -5.9218E-03 | 7.7934E-02 | -5.4930E-02 | 1.9729E-02 |
| R9 | -3.7396E+00 | -1.1468E-01 | 1.4467E-01 | -1.1190E-01 | 4.6457E-02 | -1.1268E-02 |
| R10 | -3.7672E+00 | -1.6599E-01 | 2.1241E-01 | -1.4917E-01 | 6.0394E-02 | -1.5036E-02 |
| R11 | -8.2828E+00 | -5.9218E-02 | -1.5373E-01 | 1.5103E-01 | -6.6875E-02 | 1.7371E-02 |
| R12 | -1.0492E+00 | -2.3701E-01 | 7.8691E-02 | -1.8414E-02 | 3.2819E-03 | -4.1807E-04 |

| | Conic coefficient | Aspheric surface coefficients | | | |
| | k | A14 | A16 | A18 | A20 |
|---|---|---|---|---|---|
| R1 | -3.7642E+01 | -1.4243E-08 | 6.7578E-12 | 0.0000E+00 | 0.0000E+00 |
| R2 | 1.8197E+00 | 3.6954E-01 | -2.4954E-01 | 8.2892E-02 | -1.0849E-02 |
| R3 | -9.0000E+01 | 5.4283E+02 | -9.4594E+02 | 9.0363E+02 | -3.6474E+02 |
| R4 | 3.5315E+01 | -1.2648E+00 | 1.5047E+00 | -7.6875E-01 | 1.4783E-01 |
| R5 | -6.3080E+00 | 2.9848E-01 | -1.0012E-01 | 1.8869E-02 | -1.5233E-03 |
| R6 | -5.1907E+00 | -4.5473E-01 | 1.4371E-01 | -2.5170E-02 | 1.8687E-03 |
| R7 | -8.4851E+01 | -1.0420E-01 | 1.4754E-02 | 8.4052E-04 | -3.4421E-04 |
| R8 | -2.4914E+01 | -4.3426E-03 | 6.0144E-04 | -4.7427E-05 | 1.5655E-06 |
| R9 | -3.7396E+00 | 1.6683E-03 | -1.4913E-04 | 7.4004E-06 | -1.5641E-07 |
| R10 | -3.7672E+00 | 2.3413E-03 | -2.2207E-04 | 1.1710E-05 | -2.6248E-07 |
| R11 | -8.2828E+00 | -2.7742E-03 | 2.6571E-04 | -1.3914E-05 | 3.0493E-07 |
| R12 | -1.0492E+00 | 3.4616E-05 | -1.7230E-06 | 4.6340E-08 | -5.1528E-10 |

Table 11 and table 12 show design data of inflexion points and arrest points of each lens of the camera optical lens 30.

TABLE 11

| | Number(s) of inflexion points | Inflexion point position 1 | Inflexion point position 2 | Inflexion point position 3 | Inflexion point position 4 |
|---|---|---|---|---|---|
| P1R1 | 1 | 0.695 | / | / | / |
| P1R2 | 0 | / | / | / | / |
| P2R1 | 1 | 0.075 | / | / | / |
| P2R2 | 0 | / | / | / | / |
| P3R1 | 2 | 0.535 | 0.985 | / | / |
| P3R2 | 1 | 1.395 | / | / | / |
| P4R1 | 1 | 0.275 | / | / | / |
| P4R2 | 2 | 0.405 | 1.025 | / | / |
| P5R1 | 3 | 0.915 | 1.805 | 2.245 | / |
| P5R2 | 1 | 1.085 | / | / | / |
| P6R1 | 4 | 0.475 | 1.595 | 1.975 | 2.585 |
| P6R2 | 3 | 0.585 | 1.925 | 2.205 | / |

TABLE 12

| | Number(s) of arrest points | Arrest point position 1 | Arrest point position 2 | Arrest point position 3 |
|---|---|---|---|---|
| P1R1 | 1 | 1.455 | / | / |
| P1R2 | 0 | / | / | / |
| P2R1 | 1 | 0.125 | / | / |
| P2R2 | 0 | / | / | / |
| P3R1 | 0 | / | / | / |
| P3R2 | 0 | / | / | / |
| P4R1 | 1 | 0.465 | / | / |
| P4R2 | 2 | 0.855 | 1.175 | / |
| P5R1 | 3 | 1.565 | 2.105 | 2.345 |
| P5R2 | 1 | 1.815 | / | / |
| P6R1 | 1 | 0.865 | / | / |
| P6R2 | 1 | 1.225 | / | / |

Figure 10:
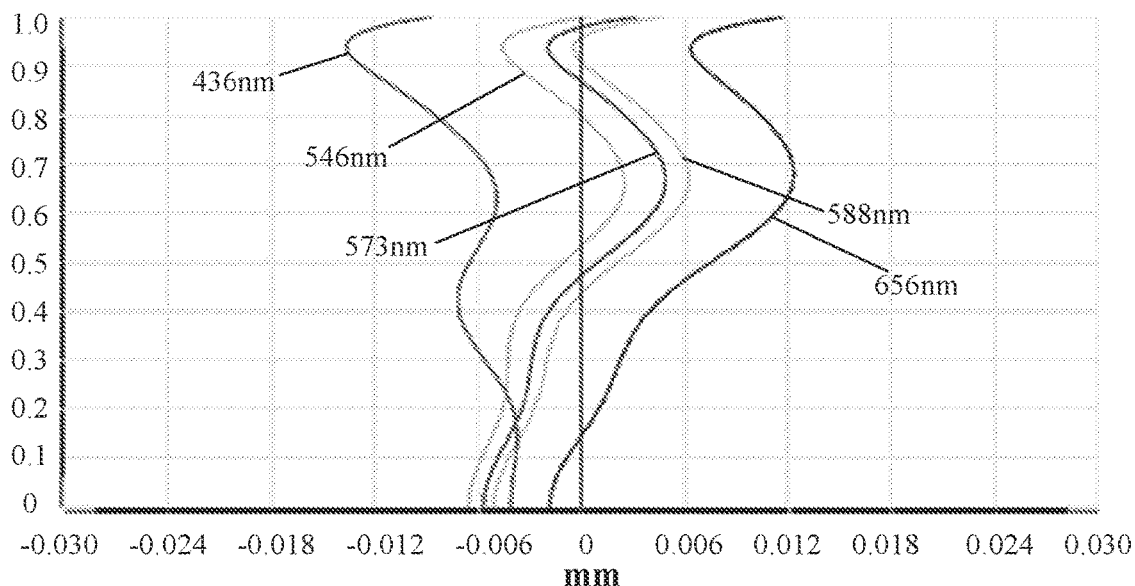
FIG. 10 is a schematic diagram of a longitudinal aberration of the camera optical lens shown in FIG. 9.
Figure 11:
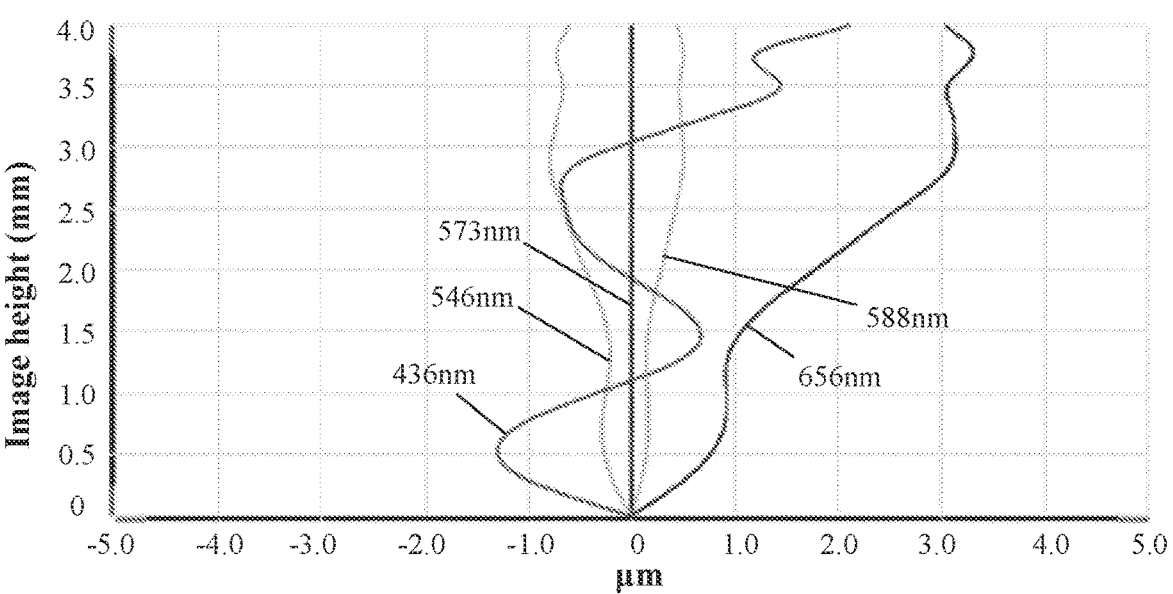
FIG. 11 is a schematic diagram of a lateral color of the camera optical lens shown in FIG. 9.
Figure 12:
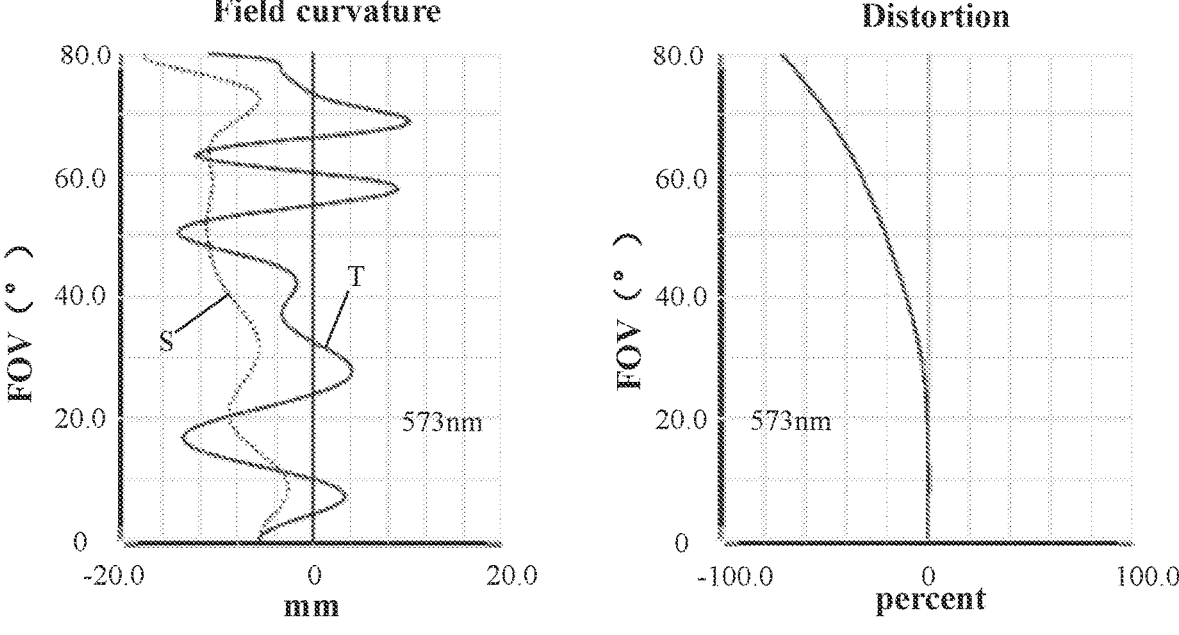
FIG. 12 is a schematic diagram of a field curvature and a distortion of the camera optical lens shown in FIG. 9.

FIG. 10 and FIG. 11 illustrate a longitudinal aberration and a lateral color of light with wavelengths of 656 nm, 588 nm, 573 nm, 546 nm and 436 nm after passing the camera optical lens 30, respectively. FIG. 12 illustrates a field curvature and a distortion of light with a wavelength of 573 nm after passing the camera optical lens 30. A field curvature S in FIG. 12 is a field curvature in a sagittal direction, and T is a field curvature in a tangential direction.

As shown in following table 17, the camera optical lens 30 in the present embodiment satisfies each condition.

In this embodiment, an entrance pupil diameter (ENPD) of the camera optical lens 30 is 0.909 mm, an image height of (IH) is 4.000 mm, and a field of view (FOV) in the diagonal direction is 160.00°. Thus, the camera optical lens 30 satisfy a design requirement of wide angle and ultra-thinness, the on-axis and off-axis aberration is sufficiently corrected, thereby achieving excellent optical performance.

Embodiment 4

Figure 13:
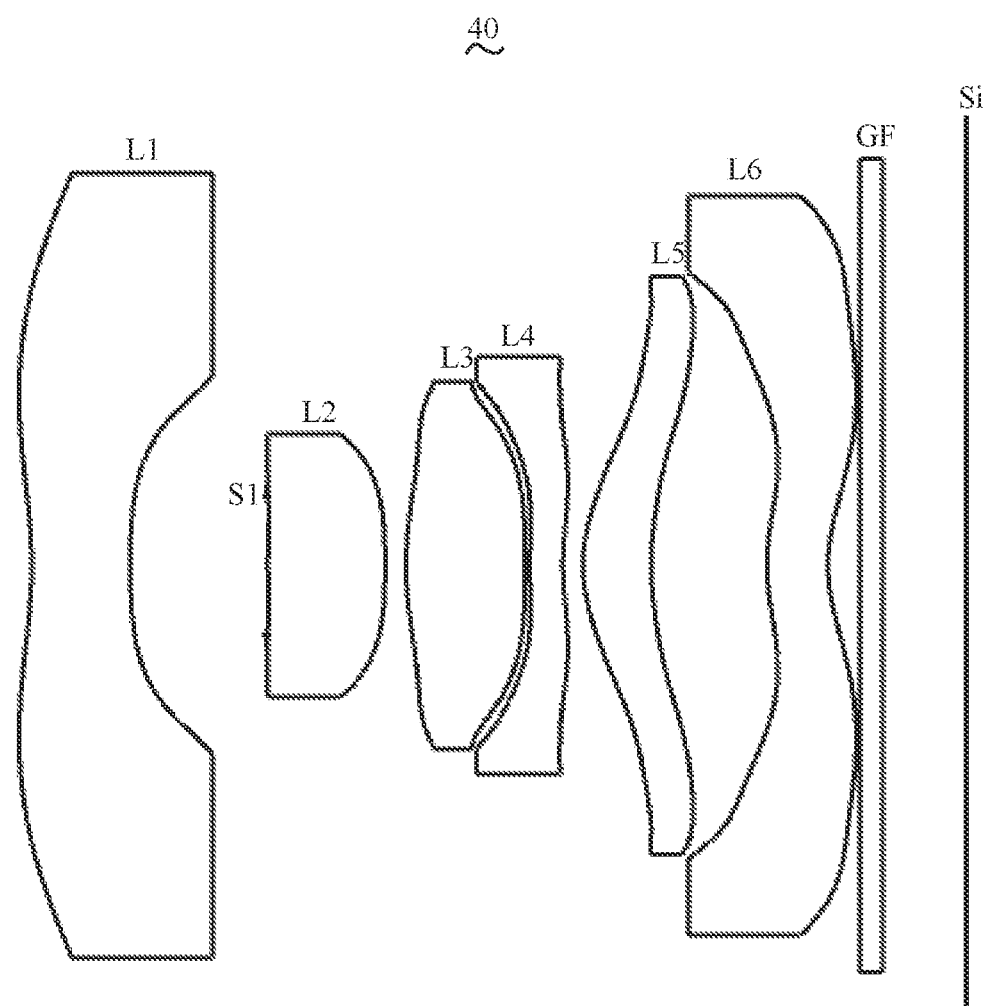
FIG. 13 a schematic diagram of a structure of a camera optical lens according to Embodiment 4 of the present disclosure.

FIG. 13 is a schematic diagram of a structure of a camera optical lens 40 according to Embodiment 4. Embodiment 4 is basically the same as Embodiment 1 and involves symbols having the same meanings as Embodiment 1, the same part will not be described anymore and only differences therebetween will be described in the following.

Table 13 and Table 14 show design data of a camera optical lens 40 in Embodiment 4 of the present disclosure.

TABLE 13

| | R | | D | | nd | | vd |
|---|---|---|---|---|---|---|---|
| S1 | ∞ | d0= | -2.078 | | | | |
| R1 | -3.613 | d1= | 0.872 | nd1 | 1.5267 | v1 | 76.60 |
| R2 | 7.963 | d2= | 1.220 | | | | |
| R3 | 20.533 | d3= | 1.035 | nd2 | 1.5444 | v2 | 55.82 |
| R4 | -8.111 | d4= | 0.185 | | | | |
| R5 | 2.673 | d5= | 1.058 | nd3 | 1.5267 | v3 | 76.60 |
| R6 | -9.569 | d6= | 0.040 | | | | |
| R7 | 10.911 | d7= | 0.294 | nd4 | 1.6700 | v4 | 19.39 |
| R8 | 2.738 | d8= | 0.176 | | | | |
| R9 | 1.263 | d9= | 0.606 | nd5 | 1.5346 | v5 | 55.69 |
| R10 | 2.485 | d10= | 1.022 | | | | |
| R11 | 1.835 | d11= | 0.541 | nd6 | 1.6400 | v6 | 23.54 |
| R12 | 1.460 | d12= | 0.280 | | | | |
| R13 | ∞ | d13= | 0.210 | ndg | 1.5170 | vg | 64.17 |
| R14 | ∞ | d14= | 0.735 | | | | |

Table 14 shows aspheric surface coefficients of each lens of the camera optical lens 40 according to Embodiment 4 of the present disclosure.

TABLE 14

| | Conic coefficient | Aspheric surface coefficients | | | | |
|---|---|---|---|---|---|---|
| | k | A4 | A6 | A8 | A10 | A12 |
| R1 | −2.8294E+01 | 1.9494E−02 | −2.8207E−03 | 2.8558E−04 | −1.7724E−05 | 5.4907E−07 |
| R2 | 8.8862E+00 | 1.1169E−01 | −6.3039E−02 | 3.2843E−02 | 5.2635E−02 | −1.0535E−01 |
| R3 | 7.2275E+01 | −7.4969E−02 | 1.8984E−01 | −2.8937E+00 | 2.1315E+01 | −9.6931E+01 |
| R4 | 4.3620E+01 | −1.9303E−01 | 1.0535E−01 | −1.6040E−01 | 1.8022E−01 | −5.4842E−02 |
| R5 | −5.5119E+00 | −7.9445E−02 | 6.5526E−02 | −1.1370E−01 | 1.3414E−01 | −1.0674E−01 |
| R6 | 2.2835E+01 | 5.9361E−02 | −5.9189E−01 | 1.1476E+00 | −1.2772E+00 | 9.0364E−01 |
| R7 | −9.0000E+01 | 3.5059E−02 | −8.2329E−01 | 1.4581E+00 | −1.3679E+00 | 8.1007E−01 |
| R8 | −2.4914E+01 | −5.9474E−02 | −2.0155E−01 | 3.1600E−01 | −2.1799E−01 | 8.9930E−02 |
| R9 | −7.2086E+00 | 2.1035E−02 | 2.0873E−02 | −3.2747E−02 | 1.4883E−02 | −3.5084E−03 |
| R10 | −1.9926E+01 | −8.0904E−02 | 1.9409E−01 | −1.6280E−01 | 7.2470E−02 | −1.9477E−02 |
| R11 | −3.7705E+00 | −1.7366E−01 | 2.3404E−02 | 3.1525E−02 | −2.3034E−02 | 7.6938E−03 |
| R12 | −1.0209E+00 | −2.1126E−01 | 8.7675E−02 | −2.6878E−02 | 5.6363E−03 | −7.6374E−04 |

| | Conic coefficient | Aspheric surface coefficients | | | |
|---|---|---|---|---|---|
| | k | A14 | A16 | A18 | A20 |
| R1 | −2.8294E+01 | −4.7046E−09 | −7.1515E−11 | 0.0000E+00 | 0.0000E+00 |
| R2 | 8.8862E+00 | 8.1136E−02 | −3.2332E−02 | 6.5119E−03 | −5.2318E−04 |
| R3 | 7.2275E+01 | 2.7327E+02 | −4.6219E+02 | 4.2641E+02 | −1.6408E+02 |
| R4 | 4.3620E+01 | −1.3277E−01 | 1.8968E−01 | −1.0141E−01 | 1.9822E−02 |
| R5 | −5.5119E+00 | 6.1743E−02 | −2.3272E−02 | 4.9065E−03 | −4.3481E−04 |
| R6 | 2.2835E+01 | −4.1449E−01 | 1.1920E−01 | −1.9354E−02 | 1.3423E−03 |
| R7 | −9.0000E+01 | −3.1483E−01 | 7.8112E−02 | −1.1249E−02 | 7.2067E−04 |
| R8 | −2.4914E+01 | −2.3632E−02 | 3.8688E−03 | −3.5678E−04 | 1.4046E−05 |
| R9 | −7.2086E+00 | 4.8795E−04 | −4.0901E−05 | 1.9254E−06 | −3.9152E−08 |
| R10 | −1.9926E+01 | 3.2730E−03 | −3.3688E−04 | 1.9404E−05 | −4.7779E−07 |
| R11 | −3.7705E+00 | −1.4452E−03 | 1.5411E−04 | −8.6562E−06 | 1.9824E−07 |
| R12 | −1.0209E+00 | 6.4654E−05 | −3.2764E−06 | 9.0379E−08 | −1.0400E−09 |

Table 15 and table 16 show design data of inflexion points and arrest points of each lens of the camera optical lens 40.

TABLE 15

| | Number(s) of inflexion points | Inflexion point position 1 | Inflexion point position 2 | Inflexion point position 3 | Inflexion point position 4 |
|---|---|---|---|---|---|
| P1R1 | 1 | 0.705 | / | / | / |
| P1R2 | 1 | 1.495 | / | / | / |
| P2R1 | 1 | 0.245 | / | / | / |
| P2R2 | 0 | / | / | / | / |
| P3R1 | 3 | 0.635 | 1.115 | 1.615 | / |
| P3R2 | 1 | 1.385 | / | / | / |
| P4R1 | 2 | 0.285 | 1.555 | / | / |
| P4R2 | 2 | 0.395 | 1.125 | / | / |
| P5R1 | 1 | 1.065 | / | / | / |
| P5R2 | 2 | 1.195 | 2.625 | / | / |
| P6R1 | 4 | 0.485 | 1.765 | 2.015 | 2.575 |
| P6R2 | 3 | 0.645 | 2.135 | 2.315 | / |

TABLE 16

| | Number(s) of arrest points | Arrest point position 1 | Arrest point position 2 |
|---|---|---|---|
| P1R1 | 1 | 1.525 | / |
| P1R2 | 0 | / | / |
| P2R1 | 1 | 0.405 | / |
| P2R2 | 0 | / | / |
| P3R1 | 0 | / | / |
| P3R2 | 1 | 1.645 | / |
| P4R1 | 1 | 0.435 | / |
| P4R2 | 2 | 0.725 | 1.695 |
| P5R1 | 1 | 2.365 | / |
| P5R2 | 1 | 2.185 | / |

TABLE 16-continued

| | Number(s) of arrest points | Arrest point position 1 | Arrest point position 2 |
|---|---|---|---|
| P6R1 | 1 | 0.915 | / |
| P6R2 | 1 | 1.535 | / |

Figure 14:
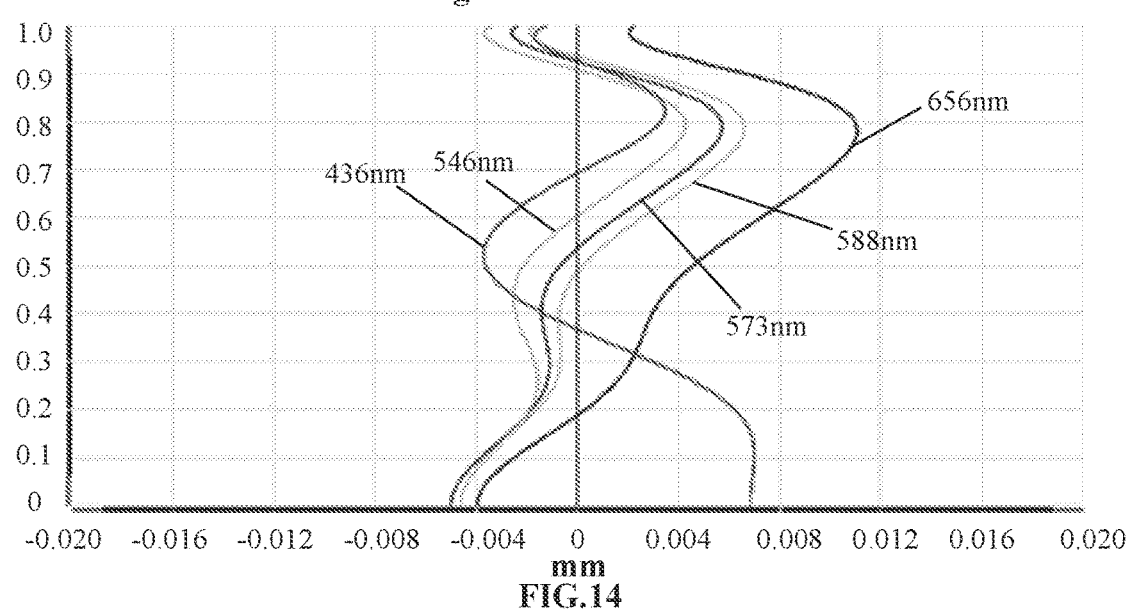
FIG. 14 is a schematic diagram of a longitudinal aberration of the camera optical lens shown in FIG. 13.
Figure 15:
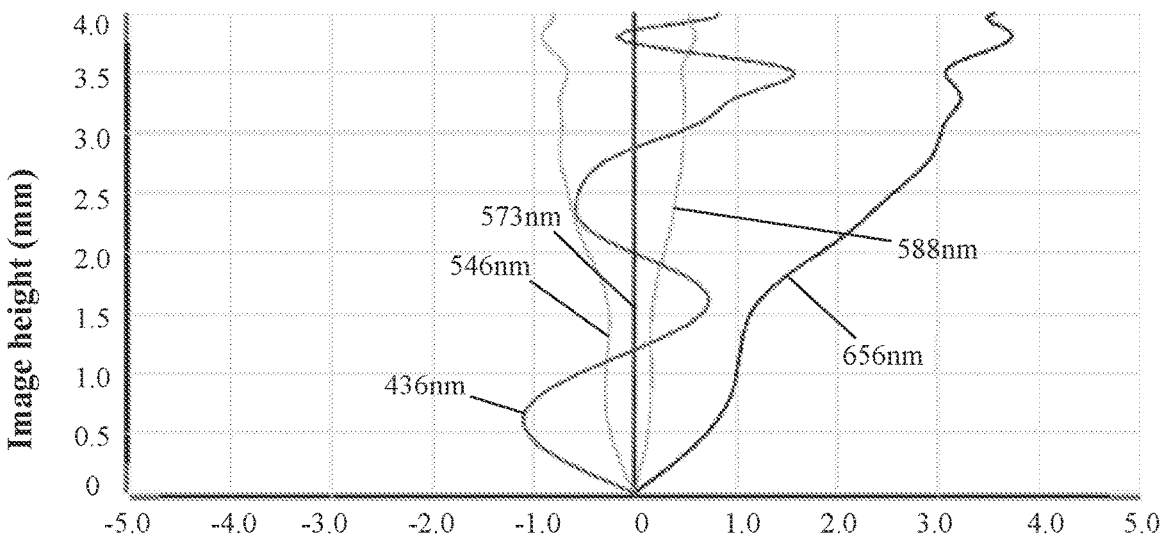
FIG. 15 is a schematic diagram of a lateral color of the camera optical lens shown in FIG. 13.
Figure 16:
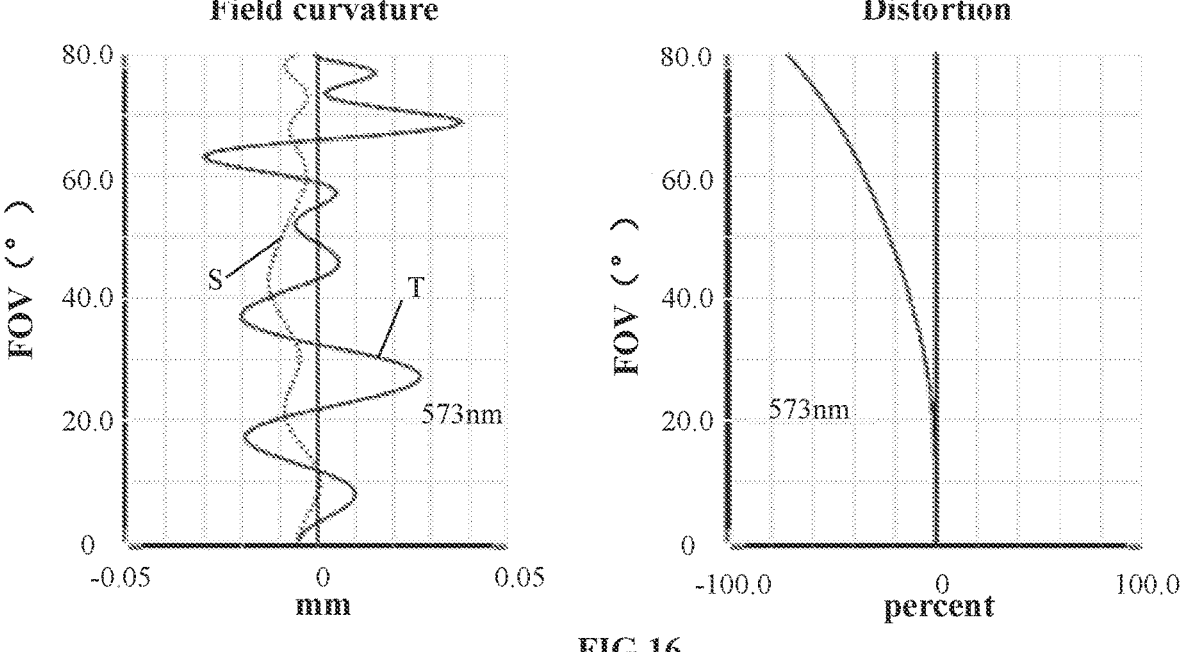
FIG. 16 is a schematic diagram of a field curvature and a distortion of the camera optical lens shown in FIG. 13.

FIG. 14 and FIG. 15 illustrate a longitudinal aberration and a lateral color of light with wavelengths of 656 nm, 588 nm, 573 nm, 546 nm and 436 nm after passing the camera optical lens 40, respectively. FIG. 16 illustrates a field curvature and a distortion of light with a wavelength of 573 nm after passing the camera optical lens 40. A field curvature S in FIG. 16 is a field curvature in a sagittal direction, and T is a field curvature in a tangential direction.

As shown in following table 17, the camera optical lens 40 in the present embodiment satisfies each condition.

In this embodiment, an entrance pupil diameter (ENPD) of the camera optical lens 30 is 0.922 mm, an image height of (IH) is 4.000 mm, and a field of view (FOV) in the diagonal direction is 160.00°. Thus, the camera optical lens 40 satisfy a design requirement of wide angle and ultra-thinness, the on-axis and off-axis aberration is sufficiently corrected, thereby achieving excellent optical performance.

TABLE 17

| Parameters and conditions | Embodiment 1 | Embodiment 2 | Embodiment 3 | Embodiment 4 |
|---|---|---|---|---|
| $f2/f$ | 3.01 | 4.00 | 4.98 | 4.26 |
| (R9 + R10)/(R9 − R10) | −5.99 | −2.00 | −10.00 | −3.07 |
| f | 2.517 | 2.536 | 2.501 | 2.536 |
| f1 | −4.191 | −4.295 | −3.792 | −4.594 |

TABLE 17-continued

| Parameters and conditions | Embodiment 1 | Embodiment 2 | Embodiment 3 | Embodiment 4 |
|---|---|---|---|---|
| f2 | 7.581 | 10.143 | 12.454 | 10.803 |
| f3 | 4.593 | 4.091 | 2.660 | 4.084 |
| f4 | −10.441 | −5.784 | −6.843 | −5.514 |
| f5 | 6.557 | 3.669 | 11.067 | 4.092 |
| f6 | −18.886 | −7.608 | −30.009 | −25.468 |
| f12 | −24.943 | −11.680 | −6.807 | −12.049 |
| FNO | 2.75 | 2.75 | 2.75 | 2.75 |
| TTL | 8.258 | 8.266 | 7.853 | 8.274 |
| FOV | 160.00° | 160.00° | 160.00° | 160.00° |
| IH | 4.000 | 4.000 | 4.000 | 4.000 |
| f2/f | 3.01 | 4.00 | 4.98 | 4.26 |

What is described above are merely specific embodiments of present disclosure. It should be pointed out that, those of ordinary skill in the art may make changes without deviating from the creative idea of the present disclosure, and these all belong to the protection scope of the disclosure.

What is claimed is:

1. A camera optical lens, with six lenses, comprising from an object side to an image side:

a first lens having a negative refractive power;

a second lens having a positive refractive power;

a third lens having a positive refractive power;

a fourth lens having a negative refractive power;

a fifth lens having a positive refractive power; and a sixth lens having a negative refractive power;

wherein the camera optical lens satisfies the following conditions;

$$3.00 \leq f2/f \leq 5.00;$$

$$-10.00 \leq (R9+R10)/(R9-R10) \leq -2.00;$$

$$-3.62 \leq f1/f \leq -1.01;$$

$$0.05 \leq d1/TTL \leq 0.21; \text{ and}$$

$$FOV \geq 160.00°;$$

where f denotes a focal length of the camera optical lens;

f2 denotes a focal length of the second lens;

R9 denotes a central curvature radius of an object-side surface of the fifth lens;

R10 denotes a central curvature radius of an image-side surface of the fifth lens; and FOV denotes a field of view of the camera optical lens.

2. The camera optical lens according to claim 1 further satisfying the following condition:

$$-12.00 \leq f6/f \leq -3.00;$$

where f6 denotes a focal length of the sixth lens.

3. The camera optical lens according to claim 1 further satisfying the following conditions:

$$0.22 \leq (R3+R4)/(R3-R4) \leq 1.39; \text{ and}$$

$$0.06 \leq d3/TTL \leq 0.19;$$

where

R3 denotes a central curvature radius of an object-side surface of the second lens;

R4 denotes a central curvature radius of an image-side surface of the second lens;

d3 denotes an on-axis thickness of the second lens; and

TTL denotes a total optical length of the camera optical lens.

4. The camera optical lens according to claim 1 further satisfying the following conditions:

$$0.53 \leq f3/f \leq 2.74;$$

$$-1.15 \leq (R5+R6)/(R5-R6) \leq -0.04; \text{ and}$$

$$0.06 \leq d5/TTL \leq 0.22;$$

where f3 denotes a focal length of the third lens;

R5 denotes a central curvature radius of an object-side surface of the third lens;

R6 denotes a central curvature radius of an image-side surface of the third lens;

d5 denotes an on-axis thickness of the third lens; and

TTL denotes a total optical length of the camera optical lens.

5. The camera optical lens according to claim 1 further satisfying the following conditions:

$$-8.30 \leq f4/f \leq -1.45;$$

$$0.84 \leq (R7+R8)/(R7-R8) \leq 5.74; \text{ and}$$

$$0.02 \leq d7/TTL \leq 0.05;$$

where f4 denotes a focal length of the fourth lens;

R7 denotes a central curvature radius of an object-side surface of the fourth lens;

R8 denotes a central curvature radius of an image-side surface of the fourth lens;

d7 denotes an on-axis thickness of the fourth lens; and

TTL denotes a total optical length of the camera optical lens.

6. The camera optical lens according to claim 1 further satisfying the following conditions:

$$0.72 \leq f5/f \leq 6.64; \text{ and}$$

$$0.03 \leq d9/TTL \leq 0.13;$$

where f5 denotes a focal length of the fifth lens;

d9 denotes an on-axis thickness of the fifth lens; and

TTL denotes a total optical length of the camera optical lens.

7. The camera optical lens according to claim 1 further satisfying the following conditions:

$$1.95 \leq (R11+R12)/(R11-R12) \leq 16.88; \text{ and}$$

$$0.02 \leq d11/TTL \leq 0.10;$$

where

R11 denotes a central curvature radius of an object-side surface of the sixth lens;

R12 denotes a central curvature radius of an image-side surface of the sixth lens;

d11 denotes an on-axis thickness of the sixth lens; and

TTL denotes a total optical length of the camera optical lens.

8. The camera optical lens according to claim 1 further satisfying the following condition:

$$TTL/IH \leq 2.10;$$

where

TTL denotes a total optical length of the camera optical lens; and

IH denotes an image height of the camera optical lens.

9. The camera optical lens according to claim 1, wherein the first lens and the third lens are made of glass.

\* \* \* \* \*